ELECTRONIC COMPUTER

INVENTOR.
PIER GIORGIO PEROTTO
GIOVANNI De SANDRE
BY Shoemaker and Mattare
ATTORNEYS INVENTOR
PIER GIORGIO PEROTTO
GIOVANNI De SANDRE BY Shoemaker and Mattare
ATTORNEYS

ELECTRONIC COMPUTER

Original Filed March 1, 1965 5 Sheets-Sheet 3

INVENTOR
PIER GIORGIO PEROTTO
GIOVANNI De SANDRE

BY Shoemaker and Mattare
ATTORNEYS

ELECTRONIC COMPUTER

Original Filed March 1, 1965 5 Sheets-Sheet 4

INVENTOR
PIER GIORGIO PEROTTO
GIOVANNI De SANDRA
BY [signature]
ATTORNEYS

INVENTOR
PIER GIORGIO PEROTTO
GIOVANNI De SANDRE
BY Shoemaker and Mattare
ATTORNEYS 3,469,244
ELECTRONIC COMPUTER
Pier Giorgio Perotto, Torino, and Giovanni De Sandre, Sacile, Italy, assignors to Ing. C. Olivetti & C., S.p.A., Ivrea, Italy, a corporation of Italy
Continuation of application Ser. No. 435,877, Mar. 1, 1965. This application Jan. 29, 1968, Ser. No. 701,193
Claims priority, application Italy, Mar. 2, 1964, 4,933/64
Int. Cl. G11b *13/00*
U.S. Cl. 340—172.5 14 Claims

ABSTRACT OF THE DISCLOSURE

In an electronic computer for processing mixed-radix represented numbers, a single cyclic serial memory comprises $n$ registers, each one adapted to contain $m$ characters each one including $b$ bits, and is made of a single delay line adapted to contain $n \cdot m \cdot b$ bits, corresponding bits of the several registers being stored in contiguous positions of said delay line.

This patent application is a continuation of application Ser. No. 435,877 filed Mar. 1, 1965 and now abandoned.

BACKGROUND OF THE INVENTION

The present invention relates to an electronic computer, for instance a so-called desk-top computer, for processing mixed-radix represented numbers.

In the design of the known computers of the above type the basic criterion is to translate the mechanical devices used in the mechanical calculators into equivalent electronic circuits, whereby the limitation of said calculators as to storage capacity and number of different possible operations are not eliminated. More particularly, according to the model of the mechanical calculator, said electronic computers have a structure requiring in general as many groups of similar elements as are the decimal denominations of the numbers to be operated upon, whereby the cost and dimension of the computer are exceedingly high.

SUMMARY OF THE INVENTION

These and other disadvantages are obviated by the computer according to the invention, which is provided with a cyclic serial memory comprising $n$ registers each one adapted to contain $m$ characters each one including $b$ bits, and is characterized in that said memory is made of a single delay line adapted to contain $n \cdot m \cdot b$ bits, corresponding bits of the several registers being stored in contiguous positions of said delay line.

According to a further feature of the invention, a single shift register containing $b$ bits acts as a buffer storage for transferring characters to and from the computer, as a delay line for shifting the numbers stored in the computer and as a counter.

A substantial reduction in the circuit complexity and cost is achieved according to the invention, in that the counting operations and the addressing operations within each memory register are performed without using specialized counters or address register, but merely by using tag bits recorded in the memory.

A substantial increase in the operating speed of the computer according to the invention, whose operation is broken out into a sequence of statuses, is achieved by novel means for controlling and timing the passage from a status to the next following status.

These and other features and objects of the present invention will be apparent from the following description, made by way of example and not in a limiting sense, in connection with the accompanying drawings.

BRIEF DESCRIPTION OF THE DRAWINGS

FIGS. 1*a* and 1*b* are to be composed;

DESCRIPTION OF A PREFERRED EMBODIMENT OF THE INVENTION

General description

Figure 1A:
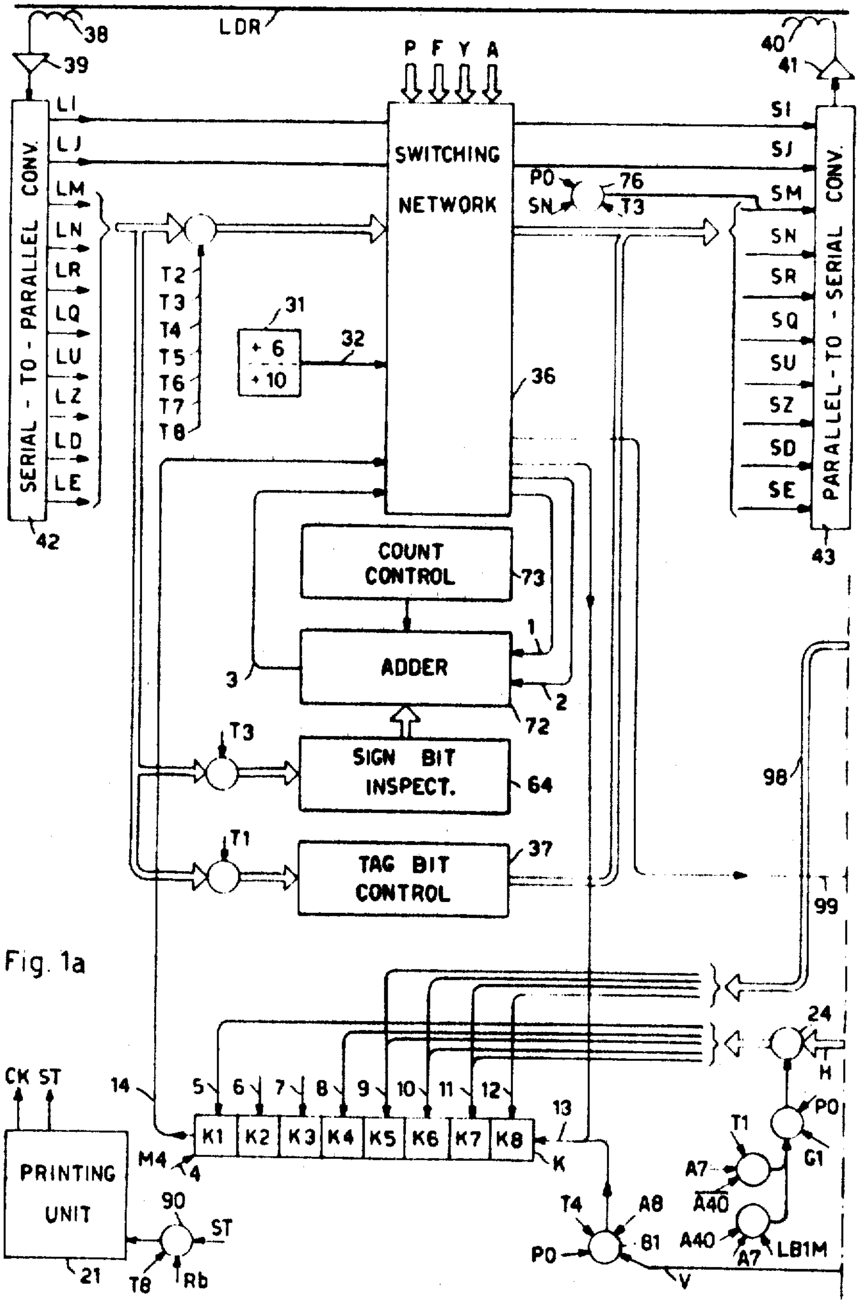
FIGS. 1*a* and 1*b* show a block diagram of the circuits of the computer according to an embodiment of the invention.

The computer comprises a storage made of magnetostrictive delay line LDR including for instance ten registers I, J, M, N, R, Q, U, Z, D, E and provided with a reading transducer 38 feeding a reading amplifier 39 and with a writing transducer 40 fed by a writing amplifier 41.

Each memory register comprises for instance 22 decimal denominations, each one comprising eight binary denominations, whereby each register may store up to 22 eight-bit characters. Both the characters and the bits are processed in series. Therefore a train of $10 \cdot 8 \cdot 22$ binary signals recirculates in the delay line LDR.

The ten first occurring binary signals represent the first bit of the first decimal denomination of the register R, N, M, J, I, Q, U, Z, D and E respectively, the ten next following binary signals represent the second bit of said first decimal denomination of said registers respectively, etc.

Assuming for instance said binary signals are recorded in the delay line so as to be spaced 1 microsecond from each other, the signals belonging to a certain register will be spaced 10 microseconds from each other. Otherwise stated, each register comprises a train of $8 \cdot 22$ binary signals spaced 10 microseconds from each other, the trains belonging to the several registers being displaced 1 microsecond from each other.

The reading amplifier 39 feeds a serial-to-parallel converter 42, which produces over ten separate outputs lines LR, LM, LN, LJ, LI, LE, LD, LQ, LU and LZ, ten simultaneous signals representing the ten bits stored in the same binary denomination of the same decimal denomination of the ten registers respectively.

Therefore, at a given instant ten signals representing the first bit of the first decimal denomination of the ten registers are simultaneously present on said ten output lines; ten microseconds later, ten signals representing the second bit of the first decimal denomination are present on said output lines, etc.

Each group of ten signals simultaneously delivered on the output lines of the converter 42 after being processed is fed to a parallel-to-serial converter 43, which feeds the writing amplifier 41 with said ten signals restored in their previous serial order and spaced 1 microsecond from each other, whereby the transducer 40 writes in the delay lines said signals either unchanged or modified according to the operation of the computer, while maintaining their previous relative location. Therefore it is apparent that the single delay line LDR is equivalent, with respect to the external circuits which process its contents, to a group of ten delay lines working in parallel, each one containing a single register and provided with an output line LR, LM, LN, LJ, LI, LE, LD, LQ, LU and LZ respectively and with an input line SR, SM, SN, SJ, SI, SE, SD, SQ, SU and SZ respectively.

This interleaved arrangement of the signals in the delay line allows all the registers of the computer to be contained in a single delay line provided with a single reading transducer and a single writing transducer, whereby the ultimate cost of the memory does not exceed the cost of a delay line containing only one register. Moreover, as the pulse repetition frequency in the delay line is ten times greater than in the other circuits of the computer, it is possible to simultaneously attain a good utilization of the storage capacity of the delay line while using low speed switching circuits in the other parts of the computer, thus substantially reducing the cost of the machine.

As the delay line storage is cyclic in nature, the operation of the computer is divided into successive memory cycles, each cycle comprising twenty-two digit periods C1 to C22, and each digit period being divided into eight bit periods T1 to T8.

Figure 3:
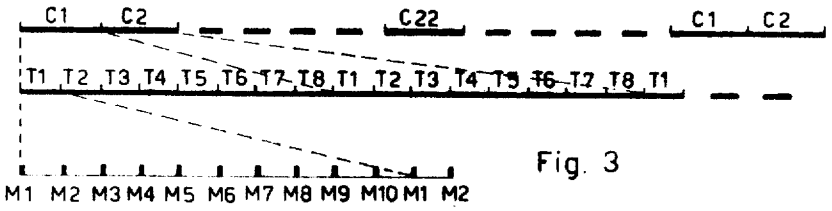
FIG. 3 shows a time diagram of some clock signals of the computer according to FIGS. 1*a* and 1*b*.

A clock pulse generator 44 produces on the output lines T1 to T8 successive clock pulse, each one having a duration which indicates a corresponding bit period, as shown in the time diagram of FIG. 3. Otherwise stated, the output terminal T1 is energized during the entire first bit period of each one of the twenty-two digit periods, the output terminal T2 is similarly energized during the entire second bit period of each one of the twenty-two digit periods, etc.

The clock pulse generator 44 is synchronized with the delay line LDR, as will be seen, in such a way that the end of the *n*th generic bit period of the *m*th generic digit period coincides with the instant in which the ten binary signals representing the ten bits read in the *n*th binary denomination of the *m*th decimal denomination of the ten memory registers begin to be available on the outputs lines of the serial-to-parallel converter 42. Said binary signals are staticized in the converter 42 for the entire duration of the corresponding bit period. During the same bit period the signals representing the ten bits produced by processing said ten bits read out of the delay line LDR are fed to the parallel-to-serial converter 43 and written in the delay line.

More particularly the generator 44 produces during each bit period ten pulses M1 to M10 (FIG. 3). The pulse M1 defines the reading time, that is the instant when the serial-to-parallel converter 42 begins to make available the bits pertaining to the present bit period, whereas the pulse M4 indicates the writing time, that is the instant when the processed bits are fed to the parallel-to-serial converter 43 for being written into the delay line LDR.

The generator 44 comprises an oscillator 45 which, when operative, feeds a pulse distributer 46 with pulses having the frequency of said pulses M1 to M10, a frequency divider 47 fed by said distributer being arranged to produce the clock pulses T1 to T8.

The oscillator 45 is operative only as long as a bistable device A10 (FIG. 6) remains energized, said bistable device being controlled by signals circulating in the delay line LDR, as will be seen.

Each decimal denomination of the memory LDR may contain either a decimal digit or an instruction. More particularly the registers I and J, which are designated as first and second instruction register respectively, are adapted to store a program comprising a sequence of 44 instructions written in the 22 decimal denominations of the registers I and J respectively.

The remaining registers M, N, R, Z, U, Q, D, E are normally numerical registers, each one adapted to store a number having a maximum length of 22 decimal digits.

Each instruction is made of eight bits B1 to B8 stored in the binary denominations T1 to T8 respectively of a certain decimal denomination: the bits B5 to B8 represent one out of 16 operations F1 to F16 whereas bits B1 to B4 generally represent the address of an operand upon which said operation is to be performed.

Each decimal digit is represented in the computer by means of four bits B5, B6, B7, B8 according to a binary-coded decimal code. In the delay line memory LDR said four bits are recorded in the last occurring four binary denominations T5, T6, T7, T8 respectively of a certain decimal denomination, while the remaining four binary denominations are used to store certain tag bits. More particularly, in this decimal denomination the binary denomination T4 is used for storing a decimal-point bit B4, which is equal to "0" for all the digit of a decimal number except the first entire digit after the decimal point. The binary denomination T3 is used for storing a sign bit B3, which is equal to "0" for all the decimal digits of a positive number and equal to "1" for all the decimal digits of a negative number. The binary denomination T2 is used for storing a digit-identifying bit B2, which is equal to "1" in each decimal denomination occupied by a decimal digit of a number and equal to "0" in each unoccupied decimal denomination (non significant zero).

Therefore the complete representation of a decimal digit in the memory LDR requires the seven binary denominations T2, T3, T4, T5, T6, T7 and T8 of a given decimal denomination.

The remaining binary denomination T1 is used for storing a tag bit B1 whose meaning is not necessarily related to the decimal digit stored in said denomination.

In the following description a bit stored in a binary denomination *a* of a certain decimal denomination of a register *b* will be designated as B*ab*, and the signal obtained when reading said bit out of the delay line will be designated LB*ab*.

A bit B1R="1" stored in the first decimal denomination C1 of the register R is used to start the clock pulse generator 44 at the beginning of each memory cycle; a bit B1E="1" stored in the 22nd decimal denomination C22 of the register E is used to stop the generator 44; a bit B1N="1" stored in the *n*th decimal denomination of the register N indicates that during the execution of a program the next following instruction to be executed is the instruction stored in said *n*th decimal denomination of the register I or J; a bit B1M="1" stored in the *n*th decimal denomination of the register M indicates: when introducing a number from the keyboard into the register M, that the decimal digit next introduced is to be stored in the (*n*-1st) decimal denomination; when introducing an instruction from the keyboard, that the next following instruction is to be stored in the *n*th decimal denomination of the register I or J; when printing a number stored in any register selected among the registers of the delay-line, that the next following digit to be printed is the digit stored in the *n*th decimal denomination of said register; when adding together two numbers, that the digit of the sum stored in the *n*th decimal denomination of the register N shall be thereafter corrected by adding a filler digit thereto, as will be seen; a bit B1U="1" stored in the *n*th decimal denomination of the register U indicates that the execution of a main program routine has been interrupted at the *n*th instruction of the register I or J for beginning the execution of a subroutine. Therefore the tag bits B1R, B1E are used to represent fixed reference points in the various registers (beginning and end respectively); the tag bits B1N, B1M and B1U represent movable reference points within the registers; moreover the bits B1M are used, when performing an addition, to record, for each decimal denomination, an information pertaining to an operation performed or to be performed upon said denomination.

The regeneration and the modification and shifting of said tag bits B1 are performed by a tag-bit control circuit 37.

The computer comprises also a binary adder 72 provided with a pair of input lines 1 and 2 for concurrently receiving two bits to be added to simultaneously produce on the output line 3 the sum bit. More particularly, in a first embodiment shown in FIG. 4, the adder comprises a binary addition network 48, adapted to provide on the output lines S and R*b* the binary sum and the binary carry, respectively, produced by summing up two bits concurrently fed to the input lines 49 and 50 respectively and the previous binary carry bit resulting from the addition of the next preceding pair of bits, said previous binary carry bit being staticized in a carry bit storage A5 made of a bistable circuit. The signals representing the two bits to be added last from the pulse M1 to the pulse M10 of the corresponding bit period, and the signals representing the sum bit S and the carry bit R*b* are substantially simultaneous thereto. The previous carry bit is stored in the bistable circuit A5 from the pulse M10 of the next preceding bit period until the pulse M10 of the present bit period.

The new carry bit R*b* is transferred in a bistable circuit A4, in which it is staticized until the pulse M10 causes said new carry bit to be transferred into the bistable circuit A5, where it is staticized during the entire next following bit period so as to feed in proper time the addition network 48 during the addition of the next following pair of bits.

The input line 1 of the adder may be connected to the input line 49 of the addition network 48 either directly via a gate 52 or through an inverter 54 via a gate 53. Therefore it is apparent that in the first case each decimal digit is introduced without modification in the adder, whereas in the second case, as said digit is represented in binary code, the complement of said digit to 15 is introduced in the adder.

The gates 52 and 53 are controlled by a signal SOTT produced by a sign-bit processing circuit which will be described later.

The output line S of the addition network 48 may be connected to the output line 3 of the adder either directly via a gate 55 or via a gate 56 and an inverter 57 acting to complement the decimal digits to 15.

A bistable device 58 is energized through a gate 59 by every bit equal to "1" appearing on the output line S of the addition network 48 during the bit periods T6 and T7, and is deenergized through an inverter 61 and a gate 60 by every bit equal to "0" appearing on said output line S during the bit period T8.

Therefore, upon completion of the addition of a pair of decimal digits during the *n*th generic digit period, the circumstance that the bistable device 58 remains energized after the last bit period T8 of said digit period indicates that the sum digit is greater than nine and less than sixteen, whereby a decimal carry is to be transmitted to the next following decimal denomination. Through a gate 62 the output signal of the bistable device 58 indicating the presence of said decimal carry is fed into the carry storage A5, which is adapted to enter said decimal carry into the adding network 48 in the next following digit period C(*n*+1).

A decimal carry toward said next following decimal denomination is to be transmitted also in the case during said bit period T8 of the present digit period C*n* a binary carry R*b*8 is produced by summing up the two most significant bits B8, since this binary carry indicates that the sum digit is greater than fifteen. The transmission of the decimal carry is made in this case by the bistable devices A4 and A5 in the manner described above.

Therefore in all cases the circumstance that the bistable device A5 is energized after the last bit period T8 of said digit period C*n* means that there is a decimal carry to be transmitted from said digit period C*n* to the next following digit period C(*n*+1).

Should said digit period C*n* be the digit period in which the last (most significant) decimal digit among the digits of the two numbers to be added occurs, then through a gate 63 said decimal carry is stored into a bistable device RF. Therefore the bistable device RF when energized indicates that there exists an end carry resulting from the addition of the two most significant decimal digits.

Moreover the computer is provided with a shift register K comprising eight binary stages K1 to K8. Upon receiving a shift pulse over a terminal 4, the bits stored in the stages K2 to K8 are shifted into the stages K1 to K7 respectively, while the bits which are then present on the input lines 5, 6, 7, 8, 9, 10, 11, 12, 13 are transferred into the stages K1, K2, K3, K4, K5, K6, K7, K8 and again K8 respectively.

The pulses M4 produced by the pulse distributor 46 (FIG. 1*b*) are used as shift pulses for the register K, which therefore receives one shift pulse during each bit period, that is eight shift pulses during each digit period. The contents of each stage of the register K remains unchanged from the pulse M4 of each bit period until the pulse M4 of the next following bit period. Therefore it is apparent that a bit fed to the input line 13 of the register K during a certain bit period will be available on the output line 14 of the register K after eight bit periods, that is one digit period later, whereby under these conditions the register K acts as a section of delay line having a length corresponding to one digit period.

By connecting whatsoever memory register X and the shift register K in a closed loop while leaving all the remaining registers with their outputs directly connected to their respective inputs to form a closed loop, said register X is effectively lengthened one digit period with respect to said remaining registers. In this lengthened register X, the denomination which is read from the delay line concurrently with the *n*th decimal denomination of the remaining memory registers, that is during the *n*th digit period since the reading of the bit B1R which starts the generator 44, is conventionally defined as the *n*th decimal denomination. Therefore during each memory cycle the contents of the register X will be shifted one decimal denomination, that is delayed one digit period, with respect to the other registers.

Moreover the register K, due to its ability to acts as a delay line, may be used as a counter according to the principles shown at page 198 of the book "Arithmetic Operations in Digital Computers," by R. K. Richards, 1955. More particularly, when its output line 13 and its input line 14 are connected to the output line 3 and to the input line 1 of the adder 72 respectively while the input line 2 of the adder receives no signal, said counter is adapted to count successive counting pulses which are fed to the carry storing bistable device A5 according to the following criterion. By considering the eight bits contained in the register K as a binary number comprising eight binary denominations, a counting pulse may be fed into the bistable circuit A5 whenever the less significant binary denomination is read out of the register K over the output line 14. Therefore the counting pulses shall be spaced in time one digit period or a multiple thereof.

The register K is also adapted to act as a buffer memory for temporarily storing a decimal digit to the address part of an instruction or the function part of an instruction to be printed by a printing unit 21.

The register K is also adapted to act as a parallel-to-serial converter when transferring data or instruction from the keyboard 22 into the delay line memory R.

The computer comprises also an instruction staticisor 16 including eight binary stages I1 to I8 for storing the eight bits B1 to B8 of an instruction respectively.

The first four stages I1 to I4 containing the address bits B1 to B4 of said instruction feed an address decoder 17 having eight output lines Y1 to Y8, each one corresponding to one of the eight addressable memory registers, and being energized when the combination of said four bits represents the address of said register. The address of the register M is represented by four bits equal to "0," whereby the register M is automatically addresed when no address is explicitly given. The remaining four stages I5 to I8 containing the function bits B5 to B8 of said instruction feed a function decoder 18 having a set of outputs F1 to F16, each output being energized when the combination of said bits B5 to B8 represents a corresponding function.

Moreover the outputs of the stages I1 to I4 and the output lines of the stages I5 to I8 may be connected, via gates 19 and 20 respectively, to the input lines of the stages K5 to K8 of the register K respectively in order to print out the address and the function respectively staticized in said stages.

A switching network 36 is provided for selectively interconnecting according to various patterns hereinafter specified, the ten memory registers, the adder 72, the shift register K and the instruction staticisor 16 in order to properly control the transmission of data and instructions to and from the various parts of the computer. Switching network 36 is made of a diode matrix or transistor NOR-circuit matrix or equivalent switching means having no stage properties.

The selection of the memory registers according to the present address indicated by the decoder 17 is also performed by the switching network 36.

The keyboard 22 for entering the data and the instructions and for controlling the various functions of the computer comprises a numeric keyboard 65 including ten numeral keys 0 to 9 which serve the purpose of entering numbers into the memory register M via the buffer register K, in a preferred embodiment the register M being the only memory register accessible from the numeral keyboard. Moreover the keyboard 22 comprises an address keyboard 68 provided with keys each one controlling the selection of a corresponding register of the delay line memory LDR.

The keyboard 22 comprises also a function keyboard 69, including keys each one corresponding to the function part of one of the instructions the computer can execute.

The three keyboards 65, 68 and 69 control a mechanical decoder made of code bars cooperating with electrical switches for producing on four lines H1, H2, H3, H4 four binary signals representing either the four bits of a decimal digit set up on the keyboard 65 or the four bits of an address set up on the keyboard 68, or the four bits of a function set up on the keyboard 69, said decoder being also adapted to energize either an output line G1 or G2 or G3 to indicate whether the keyboard 65 or 68 or 69 respectively has been operated.

A decimal point key 67 and a negative algebraic sign key 66, when operated, directly produce a binary signal on the line V and SN respectively.

Some instructions the present computer can execute are listed below, the letter Y designating the selected register corresponding to the address staticized in the staticisor 16:

(F1) Addition: transfer the number stored in the selected Y into the resistor M, then add the contents of the register M to the contents of the register N and store the result in the register N, that is symbolically: Y- -M; (N+M)- -N;

(F2) Subtraction: similarly Y- -M; (N—M)- -N;

(F3) Multiplication: Y- -M; (N·M)- -N;

(F4) Division: Y- -M; (N:M)- -N;

(F5) Transfer from M: transfer the contents of the register M into the selected register, that is M- -Y;

(F6) Transfer into N: transfer into the register N the contents of the selected register, that is Y- -N;

(F7) Exchange: transfer the contents of the selected register into the register N and viceversa, that is Y- -N; N- -Y;

(F8) Print: print-out the contents of the selected register Y;

(F9) Print and zeroizes: print-out the contents of the selected register Y and zeroize same;

(F10) Program stop: stop the automatic execution of the program and wait until operator enters a datum into the keyboard; introduce said datum into the selected register Y (thereafter either automatic program execution or manual operation may be continued);

(F11) Extract from the register I one out of the first eight characters as specified by the address contained in the present instruction, and transfer said character into register M;

(F12) Jump to the program instruction specified in the present instruction, unconditional;

(F13) Jump, conditional.

The computer may be selectively preset to operate according to three modes, namely "manual," "automatic" and "entering program" depending on whether a three-position commutator 23 generates a signal PM, PA or IP respectively. All the aforementioned instructions may be executed in the automatic operation; the first nine instructions may also be executed in the manual operation.

During the program entering operation, the signal IP being present, the address keyboard 68 and the function keyboard 69 are operable to enter the program instructions into the registers I and J via the buffer register K. For this purpose the outputs H1 to H4 of the keyboard decoder may be connected, via gate 24, to the inputs 8 to 11 respectively of the register K. In the meantime, the keyboard 65 is inoperative.

During the automatic operation, in which the program previously entered into the memory LDR is executed, the address keyboard and the function keyboard are inoperative.

The automatic operation comprises a sequence of instruction-extract phases and instruction-execute phases. More particularly during an extract phase an instruction is extracted from the program register I, J and transferred into the staticisor 16; this phase is automatically followed by an execution phase, in which the computer under the control of said staticized instruction excutes said instruction; this execution phase is automatically followed by an extraction phase for the next following instruction, which is the extracted and staticized in lieu of the preceding one etc. As long as an instruction is staticized in the staticisor 16, the numeric register indicated by the address part of said instruction remains continuously selected, and the decoder 18 continuously produces the function signal corresponding to the function part of said instruction. During the automatic operation, also the numeric keyboard is normally inoperative, because the computer operates upon the data previously entered into the memory. This keyboard is operated only when the program instruction at present staticized is the stop instruction F10. It is apparent that this instruction allows much more data to be processed than the computer memory may contain.

During the manual operation the numeric keyboard, the address keyboard and the function keyboard may be all operative. More particularly according to this mode of operation the address keyboard and the function keyboard may be used by the operator to cause the computer to perform a sequence of operations similar to any sequence performed during the automatic operation. For this purpose the operator enters via the keyboard an address and a function, which are therefore staticized via gates 70 and 71 respectively in the staticisor 16 just like during an instruction-extract phase in the automatic operation. Moreover, by entering said instruction (address and function) into the keyboard, an instruction-execution phase is automatically instituted for executing said entered instruction in a manner similar to the execution phase in the automatic operation. Upon completion of said instruction-execution phase the computer stops and waits for a new instruction entered by the operator through the keyboard.

As previously mentioned, when no address key is operated, the register M, which is specialized to receive the data from the keyboard, is automatically addressed. Therefore, when entering via the keyboard one of the instructions F1, F2, F3, F4 corresponding to the four fundamental arithmetic operations, the operator may select not to operate the address keyboard but instead to enter a number through the numeric keyboard; in this case said operation will be performed upon said entered number. Therefore during the manual operation any arithmetic operation corresponding to the key depressed in the function keyboard 69 may be performed either upon a number previously entered into the register M via the numeric keyboard 65 or upon a number stored in a memory register selected by means of the address keyboard.

Moreover, it has been seen that during the automatic operation the functions specified in the instructions are executed upon the data previously entered in the memory. Before pushing the button AUT to start the automatic program execution, the operator after having set the computer to operate in the manual mode, may enter each one of said initial data, by first entering said datum through the numeric keyboard into the register M, then depressing the address key corresponding to the register in which said datum is to be stored, and then depressing the function key corresponding to the transfer instruction F5.

Figure 1B:
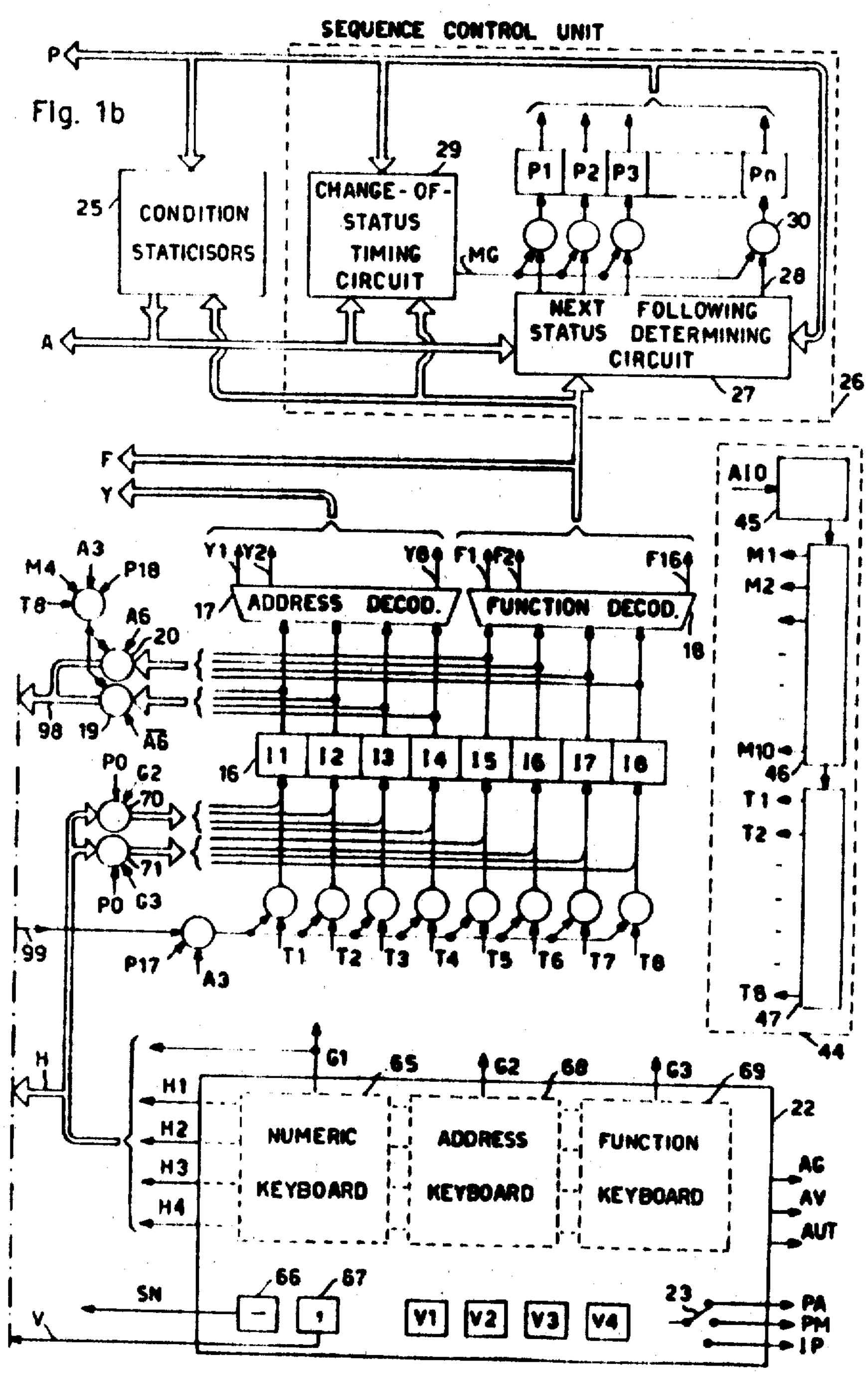
Figure 6:
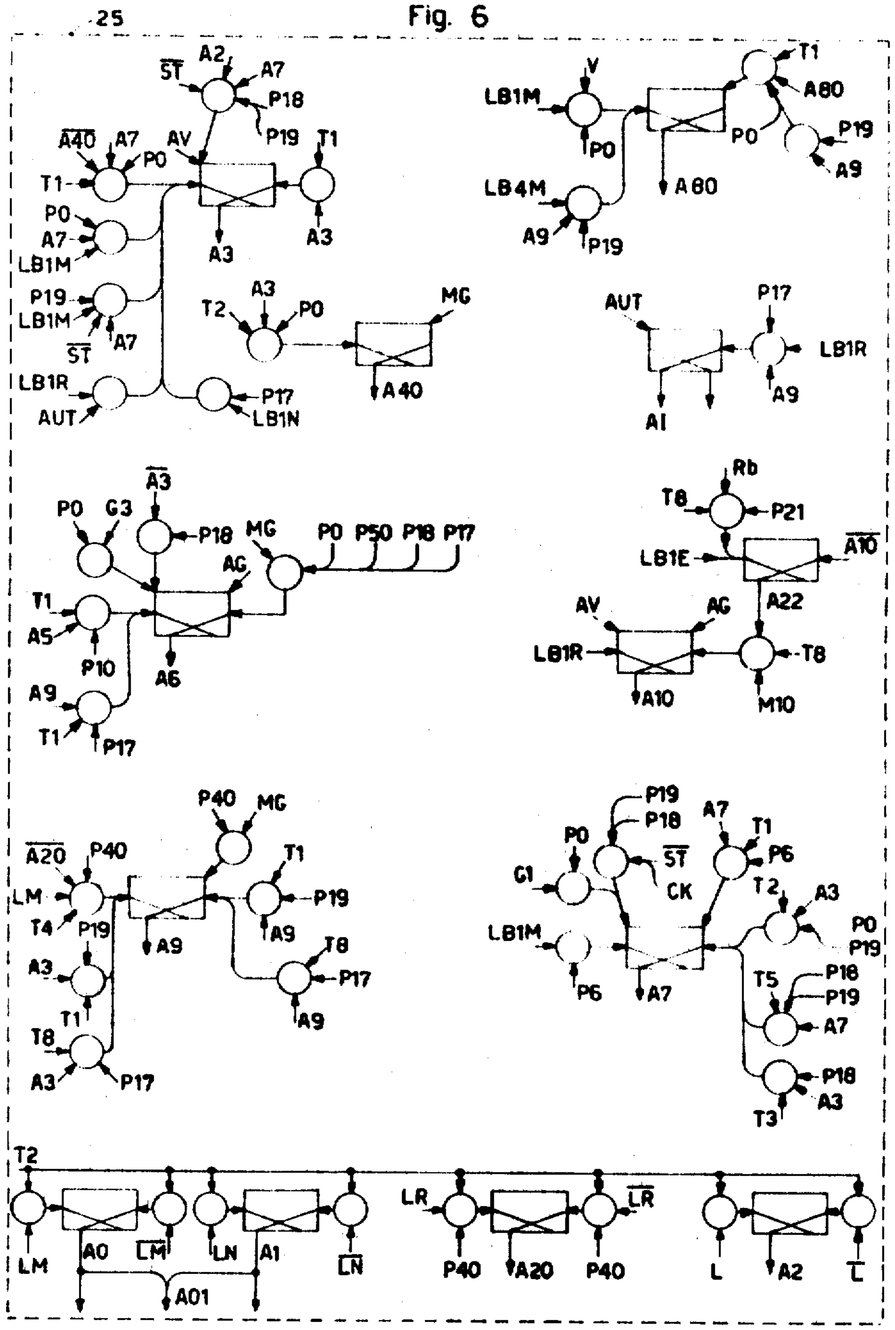
FIG. 6 shows a group of bistable devices of the computer according to FIGS. 1*a* and 1*b*.

The computer comprises also a group of bistable devices collectively represented by a box 25 in FIG. 1*b* and in more details in FIG. 6. These bistable devices are used, inter alia, to staticize some internal conditions of the computer, the output signals of said bistable devices representing said conditions being collectively designated by the reference letter A in the block diagram of FIG. 1.

More particularly, the bistable device A0 is energized during each memory cycle upon reading in the register M the first binary denomination T2 storing a digit indicating bit B2 equal to "1" and is thereafter deenergized upon reading the first binary denomination T2 storing a digit indicating bit B2 equal to "0," whereby the bistable device A0 remains energized during the entire time interval spent in reading out the number stored in the register M. Otherwise stated, the bistable device A0 indicates within each memory cycle the length and the position of the number stored in the register M. It is to be pointed out that according to a feature of the present invention said length and said position are completely variable.

The bistable devices A1 and A2 are adapted to give a similar indication as to the length and position of the number stored in the register N and Y respectively, Y designating the register at present addressed and selected. For this purpose the bistable devices A1 and A2 are controlled by the output LN of the register N and by the output L of the selected register Y respectively. The outputs of the bistable devices A0 and A1 are combined to produce a signal A01 which lasts, during each memory cycle, from the reading time of the first decimal digit among the decimal digits of the numbers M and N until the reading time of the last occurring decimal digit among said decimal digits.

The bistable devices A3 is normally used to distinctively indicate a certain digit period during which a certain operation is to be performed, said indication being obtained in that it remains energized during said digit period and deenergized during the other digit periods.

The bistable device A7 is normally used to distinctively indicate a certain memory cycle or a part thereof during the operation of the input and output units of the computer.

The bistable devices A6, A8, A9 are used to indicate the occurrence of certain conditions during the execution of certain instructions.

The function of other bistable devices of the group 25 will be described later.

The computer is also provided with a sequence control unit 26 comprising a group of status-indicating bistable devices P1 to P*n*, which are energized one at a time, whereby at any time the computer is in a certain status corresponding to one of the bistable devices P1 to P*n* at present energized. In its operation the computer goes through a sequence of statuses, and accomplishes certain elemental operations during each status. The sequence of said statuses is determined according to a criterion established by a logical network 27. More particularly on the basis of the present status of the computer indicated by the bistable devices P1 to P*n* via the line P, of the instruction at present staticized in the staticisor 16 and indicated by the decoder 18 via the line F, and of the present internal conditions of the computer indicated by the group of condition-staticizing bistable devices 25 via the line A, said network 27 decides what status must follow and gives an indication of said decision by energizing the output 28 which corresponds to said status. Thereafter a timing network 29 produces a change-of-status timing pulse MG, whereby one of the bistable devices P1 to P*n* corresponding to said next following status is energized via the gate 30 corresponding to said output 28, while all the remaining status-indicating bistable devices of the group P1 to P*n* are deenergized.

Printing unit

The serial printing unit 21 comprises a continuously rotating type drum bearing a separate circumferential row of characters for each printing column, each row occupying an arc of circumference so as to leave an arc free of character. A printing hammer, which normally lies at rest at the right end of the printing line, is adapted to be stepwise moved parallel to the axis of the type drum in synchronism with the rotation of the type drum itself so as to reach the successive printing columns for serially printing the characters of each printing line.

Each printing line comprises a number provided with a decimal point, and having on its left-hand side the corresponding algebraic sign and on its right-side a first function character indicating the operation performed upon said number and a second address character indicating the address associated with said number. Therefore the first (rightmost) circumferential row of characters on the type drum comprises the address characters Q, U, Z, D, E, M, N, R, the second row comprises the function symbols contained in the function keyboard 69, the remaining rows, beginning from the third row, are identical and comprise the ten decimal digits, the decimal point and the minus sign.

Each one of the characters of the type drum which may be either a decimal digit, or an address or function symbol represented by an alphabetic character or a special character, such as algebric sign and punctuation, is represented in the internal code of the computer by means of four bits B5, B6, B7, B8 (or B1, B2, B3, B4 in case of an address).

The arrangement of the characters on the type drum is such that, by considering said four bits B5 to B8 of each character as the pure binary representation of the natural numbers 0 to 15, the characters of each row reach the printing position in front of the printing hammer in the sequence corresponding to said natural numbers decreasing from 15 to 0. Moreover each row of characters parallel to the axis of the type drum is represented by the same combination of four bits, whereby it is associated with a same natural number. Therefore, within each circumferential row the characters may be distinguished by merely counting marks associated therewith.

The type drum has fixed thereto a timing disc bearing clock marks and cooperating with a sensing circuit for generating a timing signal CK just before each character of the type drum reaches the printing position in front of the printing hammer. Moreover said sensing circuit is adapted to generate a signal ST which during each revolution of the type drum is present during the entire time interval consumed by the arc occupied by the characters in travelling past the printing hammer, whereby absence of signal ST identifies that fraction of each revolution which corresponds to the void arc and which is allotted to the displacement of the printing hammer from a printing column to the next following printing column and to the extraction of the next character to be printed from either the delay line LDR or the instruction staticizer 16. Said fraction of each revolution lasts at least a few memory cycles.

Starting the computer operation

The operator pushes a general reset button AG, whereby the bistable devices A6 and A10 are deenergized while an eight-bit number representing the complement to 256 of the number 21 is written into the eight stages K1 to K8 of the register K respectively.

Thereafter the operator pushes a start button AV during at least a few memory cycles.

The beginning (leading edge) of the signal AV sets the machine in the status P21 and energizes the bistable device A10, whereby the timing pulse generator 44 is started.

In the status P21 the switching network 36 permanently connects the adder 72 and the register K to build up a counter in the way previously explained, and a count control circuit 73 produces a counting pulse via a gate 30 during every digit period in the bit period T1, whereby said counter in this status is adapted to count the successive digit periods because in each digit period its contents is increased one unit.

Moreover the beginning (leading edge) of the signal AV energizes the bistable device A3, which is thereafter deenergized in the next following bit period T1, thus remaining energized only during the first digit period C1. Therefore the tag-bit controlling circuit 37 causes a tag bit B1R="1" to be written via a gate 74 into the first binary position (bit period T1) of the first decimal position (digit period C1) of the register R.

The counter counts the successive digit periods, until its contents reaches the value 256. This circumstance, which occurs at the first bit period (pulse T1) of the 21st digit period C21, is detected by means of the presence of a binary carry Rb during the last bit period T8 of said 21st digit period. Therefore a bistable device A22 is energized and thereafter remains energized during the entire 22nd digit period C22. Under the control of said bistable device A22, in the circuit 37 a gate 75 is opened to write a bit B1E="1" in the first bit period T1 of the register E.

Moreover in the last bit period T8 of said 22nd digit period the bistable device A10 is deenergized by the pulse M10, whereby the timing pulse generator 44 stops.

Therefore in the status P21 two synchronizing bits are written in the delay line at the beginning and at the end respectively of a series of twenty-two digit periods, the initial (start) bit being written in the register R and the end (stop) bit in the register E.

In the status P21 the logical network 27 indicates as the next following status the status P0, whatever the internal conditions of the computer may be.

Moreover during the next following memory cycle, when the bistable device A10 is again energized by the start bit B1R="1," a signal MG is produced via a gate 82 in the change-of-status timing circuit 29, whereby the computer effectively is set in the status P0.

Synchronizing the timing pulse generator 44 with the delay line LDR

The aforementioned synchronizing bits B1R and B1E which have been stored in the delay line LDR in the computer-start status P21 are used to synchronize the generator 44 with the delay line, so as to compensate for any change in the propagation time of the pulses along the delay line or in the period of the oscillator 45.

To this end in every memory cycle following the cycle wherein said synchronizing bits have been recorded in the delay line, and whatever the present status of the computer may be, the reading signal LB1R obtained upon reading the start synchronizing bit B1R energizes the bistable device A10 and the reading signal LB1E obtained upon reading the stop synchronizing bit deenergizes said bistable device, whereby the timing pulse generator 44, as controlled by said bistable device, remains operative for exactly twenty-two digit periods during each memory cycle, apart from the irrelevant phase difference which may be produced between the delay line LDR and the timing pulse generator 44 within a single memory cycle.

This phase difference, if any, is neutralized at the beginning of each memory cycle because the instant in which said synchronizing bits B1R and B1E, after having been read out of the delay line are rewritten into the delay line is exactly timed by the clock pulses produced by the generator 44 itself.

Theerfore it is apparent that the effective length of the delay line LDR, corresponding to the pulse propagation time between the two transducers 40 and 38 plus the processing time occurring from the pulse reading instant M1 and the pulse writing instant M4, must be greater than the length of the registers, which corresponds to twenty-two digit periods of the generator 44, whereby the train of $10 \cdot 8 \cdot 22$ signals traveling along the delay line occupies only a part of the delay line, thus leaving a gap having a variable length corresponding to the difference between said two lengths.

Therefore each memory cycle, which begins when reading out of the delay line the bit B1R, has a duration of twenty-two digit periods plus a void time interval corresponding to said length difference or gap. During this time interval no change occurs in the various signals staticized in the computer and no signal is read out or written into the delay line, whereby the operation of the computer after said void interval is recommenced at exactly the same point in which it had been interrupted at the beginning of said interval, whereby the presence of said gap has no influence on the computer operation.

Entering a number into the memory via the keyboard

The status P21 is followed by the status P0 wherein the data may be entered into the memory via the keyboard.

In the status P0 the switching network 36 permanently connects the memory register M and the shift register K to build up a closed loop, whereby the register M is lengthened one digit period. In the meantime all the remaining registers have their output directly connected to their respective input so as to build up a closed loop, whereby their contents is continuously regenerated so as to remain unchanged during the following memory cycles. Also the tag bits B1 of said remaining registers are continuously regenerated through the control circuit 37, whereby the entire contents of all the registers but the register M remains unchanged during said status P0.

The timing signal MG which causes the computer to switch from the status 21 to the status P0 resets the bistable device A40. The operator pushes either the minus sign key 66 or no key depending on whether the number to be entered is negative or positive. In the first case the signal SN produced by the pushed key causes a negative sign bit B3="1" to be written via a gate 76 in the third binary denomination of all the decimal denominations of the register M. Thereafter the operator pushes the numeric key corresponding to the first decimal digit to be entered. Therefore the electrical contacts associated with the keyboard 22 produce the four binary signals H1, H2, H3, H4 representing said decimal digit and a signal G1 indicating that said four signals pertain to a numeric character entered via the numeric keyboard 65. The duration of all said signals produced by the keyboard is more than one memory cycle.

The beginning (leading edge) of said signal G1 energizes the bistable device A7. At a certain instant which may occur either before or after said leading edge, the synchronizing bit B1R circulating in the delay line starts the generator 44. During the first clock pulse T1 produced by the generator 44 after the energization of the bistable device A7, the pulse M4 by opening the gate 24 causes the bits H1, H2, H3, H4 and G1, to be transferred from the keyboard 22 into the stages K4, K5, K6, K7 and K1 of the register K respectively. Since the depressing of the key in the keyboard 22 is not synchronized with the generator 44, said first clock pulse T1 may coincide with the first bit period of whatsoever digit period C(*n*+1) among the twenty-two digit periods of the present memory cycle. Therefore at the beginning of said clock pulse T1 the stages K1 to K8 of the register K will contain the binary denominations B1 to B8 respectively of the *n*th decimal denomination of the register M. At the pulse M4 of said bit period T1 the bits of the binary denominations B2 to B8 of said *n*th decimal denomination and the bit of the first binary denomination B1 of the next following decimal denomination C(*n*+1) will be transferred into the stages K1 to K8 of the register K respectively. At the same pulse M4 the bits H1, H2, H3, H4 and G1 are entered from the keyboard 22 into the register K. Therefore these bits are written into the binary denominations B5, B6, B7, B8 and B2 respectively of said *n*th decimal denomination C*n* of the register M, the four first-mentioned bits representing the entered digit and the fifth bit being a digit-indicating bit. As previously explained, the binary denomination B3 has already been occupied by a sign bit.

Therefore it is apparent that the first digit entered via the keyboard is written at random in a certain *n*th decimal denomination, which is the first decimal denomination, which is the first decimal denomination first reaching the reading and writing transducers 38 and 40 after operation of the corresponding key.

Moreover at said pulse M4 of said first bit period T1 of the digit period C(*n*+1) the output SM of the tag-bit controlling circuit 37 is energized because the output of the gate 78 is energized. Therefore a tag bit B1M="1" is written in the first binary denomination of said *n*th decimal denomination of the register M, just ahead of thedigit being introduced from the keyboard. Moreover said clock pulse T1 energizes the bistable device A3, which is thereafter deenergized by the next following pulse T1, thus remaining energized only during said (*n*+1st) digit period in order to designate the digit period during which the digit set up on the keyboard is entered in the register M.

The clock pulse T2 of said digit period C(*n*+1) deenergize the bistable device A7, to inhibit said digit from being entered once more in the register M in the next following cycle, whereby said digit is entered only once in the register M, despite the fact that the corresponding key is held depressed during more than one memory cycle. It is thus apparent that the function of the bistable device A7 in this case is to distinguish the first memory cycle from the following memory cycles when entering a digit via the keyboard. Moreover the same clock pulse T2 energizes the bistable device A40, which will thus remain energized also during the setting up of the following digits on the keyboard in order to distinguish the first set up digit from the following ones. This is because the first entered digit is written at random in a decimal denomination of the register M, whereas the following digits must be written in the successive decimal denominations of the register M according to an ordered sequence. The purpose of the bistable device A40 is to determine this difference in the digit entering operation. Said first entered digit circulates during the following memory cycles in the register M and in the register K which are connected into a closed loop as previously explained. In the tag-bit controlling circuit 37 also the tag bits B1M are caused to be stepped through the shift register K because they are transferred from the output LM of the register M to the input 13 of the register K since gate 79 instead of gate 80 is opened, whereby said bit B1M="1" remains recorded in the *n*th decimal denomination occupied by said first entered digit, while the tag bit recorded in the first binary denomination of the remaining decimal denominations of the register M continues to be B1M="0".

Thereafter the second decimal digit of the number to be entered is set up on the keyboard, which therefore produces the binary signals H1, H2, H3, H4 representing said digit and the signal G1. As previously stated, these signals have a duration corresponding to more than one memory cycle.

As in the case of the first entered digit, the beginning of the signal G1 energizes the bistable device A7. Upon reading the tag bit B1M="1" recorded in the *n*th decimal denomination of the register M, that is the denomination occupied by the first entered digit, the bistable device A3 is energized. The bistable device A3 will be thereafter deenergized by the next following clock pulse T1, whereby it remains energized only during the *n*th digit period, which begins when said tag bit

B1M="1"

is read from the delay line LDR. It is to be pointed out that when reading said bit B1M="1" located at the beginning of the *n*th decimal denomination of the register M, the (*n*-1st) decimal denomination is in the register K, while the (*n*-2nd) decimal denomination, having just been rewritten in the register M, is at the beginning of the delay line.

When reading said tag bit B1M, the pulse M4 by opening the gate 24 causes the binary signals H1, H2, H3, H4 and G1 to be transferred from the numeric keyboard 65 into the stages K4, K5, K6, K7 and K1 of the register K respectively.

Moreover in the tag-bit controlling circuit 37 said bit B1M="1" read out of the *n*th decimal denomination of the register M is directly transferred on the output SM via the gate 30 opened by the bistable device A3 instead of being stepped through the register K.

Therefore it is apparent that the tag bit B1M="1" is recorded in the (*n*−1st) decimal denomination and that the second digit set up on the keyboard is also written in said (*n*−1st) denomination, that is the denomination which preceeds the denomination where the first digit has been entered.

It is thus clear that the tag bit B1M="1" is shifted from the *n*th decimal denomination to the (*n*−1st) denomination so as to be relocated any time at the beginning of the last entered digit.

The bistable device A7 is deenergized by the first timing pulse T2 occurring after the reading of said tag bit B1M. Therefore during the following memory cycles the repetition of the transfer process from the keyboard to the register K for the digit set up on the keyboard is avoided and the first and second digits, included the tag bit B1M="1" which at present is associated with said second digit, circulate in the closed loop formed by the registers K and M.

In a similar manner the following digits of the number are set up on the keyboard and entered into register M. In general, any new entered digit is written in the decimal denomination preceding the denomination of the last entered digit, on account of the fact the digits are entered beginning from the most significant one and read out of the delay line and processed beginning from the least significant one.

Moreover, any time a new digit is entered via the keyboard, the tag bit B1M="1" is shifted from the last entered digit to said new entered digit to allow the decimal denomination containing the last entered digit to be subsequently recognized.

It is thus apparent that any digit counter is dispensed for in this phase of the computer operation, due to the use of the shiftable tag bits.

It is also apparent that, contrary to the known computers, the operator may set up on the keyboard any number without any care as to its alignment.

For entering the decimal point the operator pushes the key 67 after having entered the units integer digit, whereby a signal V having a duration of a few memory cycles is produced. As the digit indicating signal G1 is absent, the bistable device A7, and thus also the bistable devise A3, is not energized, whereby the gate 24 connecting the keyboard to the register K remains closed, and the mechanism for shifting the tag bit B1M="1" to the next following decimal digit is inoperative.

As the bit B1M="1" associated with said units integer digit, which is now the last entered digit, is read out of the memory LDR, a bistable device A80 is energized. The bistable device A80 is thereafter deenergized by the next following clock pulse T1, whereby, assuming this digit has been entered in a certain decimal denomination Cm of the register M, said bistable device will remain energized during the entire digit period Cm. Therefore during the fourth bit period T4 of said digit period Cm a decimal-point indicating bit B4="1" is entered in the stage K8 of the register K via a gate 81. Said decimal-point indicating bit is thus written in the binary denomination T4 of the decimal denomination occupied by said units digit.

It has been thus explained how a number is entered from the keyboard 65 to the register M of the memory LDR.

In this status PO, should the operator set up an address on the keyboard 68 instead of a number on the keyboard 65, whereby the signal G2 instead of G1 is produced, the four bits H1, H2, H3, H4 representing in this case said address would be transferred via the gate 70 into the stages I1, I2, I3, I4 of the instruction staticisor 16 respectively. Thus the computer receives through the decoder 17 the address Y1 to Y8 of the selected register.

In the manual mode of operation, in the status PO the entering of a number and the selection of a register are always followed by the entering of a function via the function keyboard 69. The actuation of the keyboard 69 generates a signal G3, whereby the four bits H1, H2, H3, H4 which in the present case represent the function set-up on the keyboard, are transferred via a gate 71 into the stages I5, I6, I7, I8 of the staticisor 16 respectively, so as to indicate to the computer, through the decoder 18, the function F1 to F16 set up on the keyboard. Moreover, whatever said function may be, the beginning of the signal G3 energizes a bistable device A6, whereby in the change-of-status timing circuit 29 the leading edge of the signal A10, produced at the beginning of the next following memory cycle when the generator 44 starts, generates via a gate 83 a timing signal MG which causes the computer to switch to the next following status, said next following status being determined according to the particular instruction at present set up on the keyboard and staticized in the staticisor 16. The same signal MG deenergizes the bistable device A6, which is therefore effective to prevent the circuit 29 from unduly producing other change-of-status timing signals MG in the following memory cycles occurring during the signal G3. In said next following status, the computer will execute the instruction set up on the keyboard.

Transferring a number to and from a memory register

The transfer operations between the registers of the memory LDR are normally performed in a status P2 having a duration of a single memory cycle, that is since the oscillator 45 starts until it starts the next time. More particularly in said status P2, both in the manual and in the automatic mode of operation, assuming the instruction Y, F6 is staticized in the staticisor 16 (this means that the register at present selected is the generic register Y and the function at present staticized is F6), switching network 36 connects the output of each register except the register N to the respective input in a closed loop so as to cause its contents to be continuously regenerated and further connects the output of the addressed register Y to the input SN of the register N, whereby during a single memory cycle the contents of the register Y is transferred into the register N.

Should the instruction staticized in the staticisor 16 be equal to Y, F7, the switching network 36 connects in a distinct closed loop every memory register, except the register N and the addressed register Y, for the purpose of regenerating its contents, and further connects the output of the register N to the input of the register Y and the output of the register Y to the input of the register N, whereby the contents of the register Y is transferred into the register N and vice versa.

Should the instruction staticized into the staticisor 16 be equal to either Y, F1 (addition) or Y, F2 (subtraction) or Y, F3 (multiplication) or Y, F4 (division) or Y, F5 (transfer from M), the switching network 36 connects into a distinct closed loop every register, except the register M, for continuously regenerating its contents, and further connects the output of the addressed register Y to the input of the register M, whereby the contents of the register Y is transferred into the register M.

In all cases, should the instruction have no address specified therein, the register M is selected.

Whatever the instruction staticized by the staticisor during the status P2 may be, when the generator 44 starts again, the gate 84 in the circuit 29 is opened to produce a change-of-status timing pulse MG, which causes the computer to switch to the next following status as determined by the nature of the instruction itself.

Should the staticisor 16 have the multiplying instruction Y, F3 staticized therein, in a status P9 of the computer the switching network 36 interconnects the memory registers so as to transfer the contents of the register N into the register R.

Any other transfer operation is accomplished in a similar manner.

Aligning the numbers stored in the memory

As previously explained, the numbers are entered from the keyboard in the register M without regard to their alignment with respect to either the numbers already stored in the other registers or any reference point of the registers themselves. Before executing any arithmetic operation, the numbers to be operated upon are aligned in the following manner.

It has been pointed out that by connecting a register of the memory LDR and the shift register K so as to build up a closed loop, the contents of said memory register is delayed with respect to the other memory registers one digit period during each memory cycle.

It is first assumed that the number stored in the register M is to be aligned so as to bring its first integer digit (having the decimal point associated therewith) into the first decimal denomination C1.

In the aligning status P3, the switching network 36 connects the output and the input of the register whose contents is to be aligned, for instance the register M, to the input and the output, respectively, of the shift register K, and the output of each one of the remaining memory registers to its respective input. Therefore, in each memory cycle the contents of the register M is delayed one digit period with respect to the remaining memory registers, until during the first digit period C1

(identified by reading out of the delay line the tag bit B1R="1") of a certain memory cycle the decimal point (identified by reading out of the delay line a decimal point bit B4="1") is found. The simultaneous occurrence of said two reading pulses energizes, via a circuit not shown in the drawings, the bistable device A6, which thus indicates in this case that the required alignment has been accomplished. Therefore, as the bistable device A6 is energized, in the circuit 29 upon reading once more the first digit of the number M or N the leading edge of the signal AO1 produces via gate 86 a change-of-status timing pulse MG which causes the computer to switch to the next following status.

In a similar manner, the computer being in a status P14, a number may be shifted until its most significant digit is in the first decimal denomination C1 of a certain register, this kind of alignment being used for instance for the multiplier during multiplication.

In a similar manner, preparatory to the printing out of a number stored in a certain register, of said number may be aligned to have its least significant digit in the first decimal denomination C1 of said register. It is apparent that this aligning operation requires at least as many memory cycles as are non-significant zeroes in said number, because the number is delayed (shifted toward the most significant denominations) one decimal denomination during each memory cycle. Therefore during this aligning operation the number may be scanned beginning from the most significant denominations, in order to eliminate the nonsignificant zeroes one at each memory cycles before printing out.

In general, it is apparent that by using the tag bits the numbers may be aligned according to different criteria.

Comparing the algebraic signs of two numbers

In the status P9 of the computer, in the circuit 64 (FIG. 4) the sign bits B3 of the two registers involved are inspected and compared. Should disagreement occur, a bistable device A8, which had been energized at the beginning of said status, is deenergized. Therefore, the circumstance that after the status P9 the bistable device A8 remains either energized or not indicates that the signs of the two numbers examined are equal or not. The output ADD of the circuit 64 is energized when either the add instruction F1 is staticized and the bistable device A8 is energized or the subtract instruction F2 is staticized and the bistable device A8 is deenergized.

Addition and subtraction

The addition and the subtraction of two numbers stored in the registers M and N respectively are accomplished according to the following rules. A true addition is performed when either the signs of the numbers M and N are equal (bistable device A8 is energized) and the instruction at present staticized is F1 (addition) or the signs of the numbers N and M are different (bistable device A8 is deenergized) and the instruction at present staticized is F2 (subtraction). In the other cases a subtraction is effectively performed.

To perform an addition, during a first memory cycle, in which the computer is in the status P5, the two numbers N and M are added together digit by digit, a decimal carry being transmitted to the next higher decimal denomination if the sum digit either is greater than 15 or lies between 10 and 15, the first circumstance being indicated by the presence of a final binary carry R8 produced by summing up the most significant bits B8 and the second circumstance being indicated by the energization of the bistable device 58. For this purpose the output of the bistable device 58 during the execution of an addition is connected to the summing network 48 via a gate 62. The result obtained by adding together the two numbers in the above manner is not correct, in that some digits of the result may be greater than nine and therefore have no meaning in the binary-coded decimal code, whereby a radix correction from the binary code to the binary-decimal code is to be performed. To this end during the single memory cycle in which the computer is in the status P5 allotted to the computation of the uncorrected sum a tag bit B1M is recorded in each decimal denomination to indicate the nature of the radix correction to be performed upon the corresponding sum digit, during a following memory cycle (in which the computer is in the status P6) said sum being corrected digit by digit according to the indications given by said tag bits.

More particularly, in the case of the addition, during the second memory cycle, in which the computer is in the status P6, each digit of the sum is corrected from the binary code to the binary-decimal code by adding the filter digit +6 to each digit of the result which in the first memory cycle (while computing the uncorrected sum) had produced a decimal carry.

Therefore the addition is accomplished within two memory cycles, in which the computer is in the status P5 and P6 respectively.

In order to execute the subtraction during a first memory cycle, in which the computer is in the status P5, the numbers M and N are added together, after having complemented to 15 each decimal digit of the number N. During this cycle a decimal carry is transmitted from a denomination to the next higher denomination only if the sum digit for the first mentioned denomination is greater than 15 (this circumstance is indicated by the presence of a final binary carry R8 from the highest binary denomination T8 of said denomination), no decimal carry being transmitted if said sum digit lies between 10 and 15. For this purpose the gate 62 is held closed for preventing the output of the carry indicating bistable device 58 from being connected to the summing network 48. The absence of an end decimal carry RF resulting from the addition of the two most significant decimal digits of the numbers M and N respectively indicates in this status P5 that the number M is less than the number N, whereas the presence of said final carry RF indicates that the number N is less than the number M.

In the first case, during a following memory cycle (in which the computer is in the status P6) the radix correction is performed by adding either the filler digit +6 or +0 to each digit of the uncorrected sum depending on whether in the status P5 when adding the pair of most significant bits B8 of the corresponding decimal denomination a binary carry R8 had been produced or not. Moreover in the status P6 each digit of the sum, while being corrected, is also complemented to 15 again, whereby the subtract operation is completed within two memory cycles. If, on the contrary, the number N is less than the number M (this circumstance is indicated by the presence of said end carry RF in the status P5) in the status P6 the filler digits to be added to each digit of the uncorrected result are +0 and +10 respectively for the two cases previously considered; moreover in the status P6 the result is not recomplemented, but instead during a new memory cycle (in which the computer is in the status P7) the number +1 is added to the corrected result, thus obtaining a new result which is in turn corrected from the binary to the binary-decimal code during a following memory cycle (in which the computer is in the status P8). Therefore in this case the operation is completed in four memory cycles (corresponding to the four statuses P5, P6, P7 and P8 respectively).

The operation of the computer during the addition and the subtraction will now be described in more details.

After having aligned the two numbers M and N with respect to their decimal point in the statuses P3 and P14 respectively, and after having examined the signs of the two addends in the status P9, the computer switches to the status P5. During this status the bistable device A8 continues to give an indication as to the agreement of the signs of the two addends as determined in the status P9, whereby in the status P5 the circuit 64 (FIG. 4) produces a signal SOTT if either there is a sign disagreement and the instruction at present staticized is F1 (addition) or there is a sign agreement and the instruction at present staticized is F2 (subtraction), whereas in any other case the circuit 64 produces a signal ADD.

In the status P5 the switching network 36 permanently connects the outputs LN and LM of the registers N and M to the two inputs 1 and 2 of the adder 72 respectively, the output 3 of the adder to the input 13 of the register K and the output 14 of the register K to the input SN of the register N. Moreover the output of all the memory registers, except the register N, is connected to the respective input. Therefore in this status, which lasts a single memory cycle, the contents of the register M, without being destroyed, is added to the contents of the register N, the latter contents having been either complemented to 15 digit by digit via the complementer 54 or not depending on whether the signal SOTT or ADD is present, the result being written in the register N via gate 55, while the contents of all the other registers is regenerated so as to remain unchanged.

More exactly, the connection between the inputs 1 and 2 of the adder and the outputs LM and LN of the registers M and N exists only during the bit periods T5, T6, T7 and T8 of each digit period.

During the remaining bit periods T1, T2, T3 and T4 the switching network 36 directly connects the output of the register N to the input of the register K, so as to bypass the adder 72, whereby the bits B1, B2, B3, B4 of each decimal denomination, which are tag bits to be held unmodified in this phase, are regenerated.

On the contrary during the bit periods T5, T6, T7, T8 of the generic *n*th decimal denomination the bits B5, B6, B7, B8 respectively of the corresponding decimal digit of the number M are added to the bits B5, B6, B7, B8 respectively of the corresponding decimal digit of the number N (the four last mentioned bits being inverted by the inverter 53 if the signal SOTT is present), each pair of corresponding bits being fed to the adder along with the binary carry produced by adding the next preceding pair of bits and staticized in the bistable device A5, whereby the adder 72 produces in each digit period during the bit periods T5, T6, T7 and T8 respectively, four bits representing a decimal digit of the uncorrected sum. Due to the previous explained connection of the register, said uncorrected sum digit, assuming it has been produced by adding two addend digits stored in the *n*th decimal denomination of the registers M and N respectively, is recorded in the (*n*—1st) decimal denomination of the register N.

During said generic *n*th digit period, and more exactly at the end of the last bit period T8 thereof, the binary-carry staticizing bistable device A5 is as usually energized or not depending on whether the sum of the last pair of bits B8 has generated a final binary carry R8 or not. The bistable device A5 thereafter remains as usually in the energized state until it receives from the bistable device A4 the new binary carry produced by summing up the next following pair of bits, which in this case are the first bits B5 of the next following digit period C(*n*+1). Therefore it is apparent that the bistable device A5 is adapted to feed said final binary carry R8 of the *n*th decimal denomination to the adder 72 when the adder receives the first pair of bits B5 of the (*n*—1st) decimal denomination. As said final binary carry indicates also the presence of a decimal carry, it is clear that said bistable device A5 is also adapted to transmit the decimal carry between said two decimal denominations. This happens both in the case of addition (signal ADD is present) and in the case of subtraction (signal SOTT is present). Moreover in the case of addition, but not in the case of subtraction, gate 62 is opened during the bit period T1 immediately following said bit period T8 for connecting the bistable device 58 to the bistable device A5, whereby in the case of addition when the adder receives the first pair of bits B5 of the (*n*+1st) decimal denomination the bistable device A5 feeds a decimal carry to the adder not only if the sum digit in the *n*th denomination was greater than fifteen but also if said sum digit was between ten and fifteen.

Therefore, in every case, in the status P5 the fact that the bistable device A5 is energized during the bit period T1 of the (*n*+1st) digit period indicated that a carry has been transmitted from the *n*th to the (*n*+1st) decimal denomination. In said bit period T1 the tag bit controlling circuit 37 causes a tag bit B1M="1" to be written into the (*n*+1st) decimal denomination of the register M via a gate 85 if said decimal carry has been produced in the *n*th decimal denomination. The same happens for each one of the successive digits to be added. It is to be noted that said tag bit is effectively written via gate 85 in the proper denomination because writing in the register N is now effectively delayed one digit period with respect to writing in the register M due to the fact that in the present status the contents of the register N recirculates through the register N and the shift register K while the contents of the register M recirculates only through the register M itself.

Furthermore, it is to be noted that, due to the aforesaid connection of the registers N, K and M (register M has its input directly connected to its output, while register N has its input and its output connected to the output and to the input respectively of the register K, which is long one digit period) at the end of the status P5, which lasts a single memory cycle, the uncorrected result of the addition, stored in the register N, will appear as delayed one digit period with respect to the contents of the register N.

Only in the case of subtraction (signal SOTT is present) in the first bit period T1 following the digit period in which the last (most significant) pair of decimal digits of the numbers M and N has been added, the decimal carry signal, if any, produced by adding said last pair of decimal digits is sent via gate 63 to energize the bistable device RF. The bistable device RF will thereafter indicate during the following memory cycles the existence of said end carry, whereby the circumstance that said bistable device RF is either energized or not will indicate whether the number N was less than the number M or not.

It is to be noted that gate 63 may be opened only after disappearance of the signals A1 and A0 indicating the length and position of the number N and M, whereby the bistable device is responsive only to the end carry produced by adding the last pair of digits.

Upon completion of this summation cycle, the leading edge of the signal A01 produces via gate 87 in the circuit 29 a change-of-status timing pulse MG which causes the computer to switch to the next following status. This status, as determined by the logic network 27, is the status P6, which lasts a single memory cycle and is spent for the correction of the sum.

The status P5 is always followed by the status P6, whatever the internal conditions of the computer may be.

In the status P6 the switching network 36 connects the register M and the register K so as to build up a closed loop, whereby the contents of the register M is delayed one decimal denomination with respect to the register N. Since in the preceding status P5 the contents of the register N had been delayed the same amount with respect to the register M, the two numbers M and N are thus restored into their previous alignment with respect to the decimal point. Moreover the switching network 36 connects the inputs 1 and 2 of the adder to the output LN of the register N and to the output 32 of a filler digit generator 31, and the output 3 of the adder to the input SN of the register N. As previously explained, due to the relative displacement of the numbers stored in the registers M and N, in this status P6, when beginning to read out of the delay line the *n*th decimal denomination of the register N, the tag bit B1M is read out of the delay line, this tag bit indicating what kind of radix correction is to be performed upon said *n*th digit of the uncorrected sum stored in the register N. More particularly the reading signal LB1M produced by reading said tag bit from the memory LDR either energizes the bistable device A7 or not depending on whether its value is "1" or "0," said bistable device A7 being thereafter deenergized at the beginning of the next following clock pulse T1, whereby during the entire *n*th digit period the bistable device A7 indicates what kind of correction is to be performed upon the uncorrected sum digit stored in said *n*th denomination of the register N.

More particularly, if an addition is being performed (signal ADD is present), the bistable device RF is surely deenergized, because, as previously stated, the existence of an end carry RF produced during the status P5 by adding together the most significant pair of digits has no relevance in the case of addition.

In the case of addition, in the status P6 the output S of the addition network 48 is connected to the output 3 of the adder 72 via gate 35, whereby the corrected sum produced in said status P6 is not recomplemented. Moreover, while feeding the input 49 of the addition network 48 with the digit of the *n*th decimal denomination of the register N (uncorrected sum) via gate 52, the filler digit generator 31 simultaneously feeds the input 2 with the filler digit 6, whose code representation B5=0, B6=1, B7=1, B8=0 is produced via gate 33 provided the bistable device A7 simultaneously in the energized state; if on the contrary the bistable device A7 is deenergized, generator 31 feeds the input 2 with the decimal digit 0, which is represented by four binary zeroes.

In the case of subtraction (signal SOTT is present) and if in the preceding status P5 no end decimal carry RF has been produced, whereby the bistable device RF also in this case is deenergized, in the status P6 the output S of the addition network 48 is connected to the output 3 of the adder 72 via gate 56 and inverter 57, whereby each bit B5, B6, B7, B8 of the corrected sum is inverted (and so the decimal digit represented by said four bits is recomplemented to 15) before being rewritten into the register N. The radix correction of the sum is accomplished by adding to each digit of the uncorrected sum either the filler digit 6 via gate 33 of the filler digit generator 31 or 0 as in the previous case.

If, on the contrary, in the case of subtraction, the signal RF is present to indicate that in the preceding status P5 an end decimal carry had been produced, the corrected sum produced by the adder 72 in the status P6 is written into the register N via gate 55 without complementing. Moreover in this case while feeding the addition network 48 via gate 52 with the bits B5, B6, B7, B8 of the uncorrected sum digit contained in the generic *n*th digit period of the register N, the filler digit generator 31 simultaneously produces via gate 34 the bits B5=0, B6=1, B7=0, B8=1 representing the decimal number 10 if the bistable device A7 is in the deenergized state during said digit period; if on the contrary the bistable device A7 is energized, the decimal digit 0, represented by four binary zeroes, is fed.

In all the three aforesaid cases (addition, subtraction with M less than N, subtraction with N less than M), during the status P6 the leading edge of the signal A01 produces, via the gate 87 of the circuit 29, a change-of-status timing pulse MG which causes the computer to switch to the next following status.

So in the first two cases the addition, respectively the subtraction, is completed, whereby the logic network 27 designates as the next following status either the status P17 (extract the next following instruction) if the computer is preset for the automatic mode of operation and the instruction F1 (addition) or F2 (subtraction) is at present staticized, or the status P18 (begin to print out the first addend) if the computer is preset for the manual mode of operation and the instruction F1 (addition) or F2 (subtraction) is at present staticized.

On the contrary, in the third case, in which the bistable device RF remains energized, the status P6 is followed by the status P7, in which the number +1 is added to the result stored in the register N and by a status P8 in which the digits of the new result thus obtained are corrected from the binary code to the binary decimal-code, the operation of the computer in said statuses P7 and P8 being similar to the operation in the statuses P5 and P6 respectively. In the status P8 the leading edge of the signal A01 indicating that there are no more digits to be added, causes the computer to switch (see FIG. 7) to the next following status, which is either the status P17 or the status P18 or another status as previously explained.

As to the sign of the result, in the status P6 the sign bits recorded in the register N are regenerated without modification if in the status P5 no end decimal carry RF has been produced, whereas they are inverted by obvious means not shown in the drawings before being rewritten into the delay line LDR if the final carry RF is present.

According to a second embodiment of the computer according to the invention, not shown in the drawings, the addition and the subtraction are performed according to the following rules.

In a first memory cycle (in which the machine is in the status P40) the number M is added to the number N after having complemented each digit of the number N to 15, for the only purpose of determining, on the basis of the existence of an end decimal carry RF, whether N is greater than M or not.

The operation of the computer in this status P40 is quite similar to the operation in the status P5 according to the first embodiment when the signal SOTT was present, apart that now the register N is not connected to the register K but has its output connected to its input via the adder 72.

During a second memory cycle (in which the computer is in the status P50) the number M is added to the number N, the several digits of the greater one of the two numbers M and N being either complemented to 15 or not depending on whether a subtraction or an addition is being performed. For this purpose the switching network 36 connects either the output LN of the register N and the output LM of the register M to the inputs 1 and 2 respectively of the adder 72 or vice versa depending on whether said signal RF is present or not, the input 1 being anyway connected to the input 49 via the complementer 54. In a third memory cycle (in which the computer is in the status P60) the correction from the binary code to the binary-decimal code is performed by adding the filler digit +6 to each uncorrected sum digit which has produced a final binary carry R8 and the filler digit +0 to each other uncorrected sum digit. Moreover the digits of the result are recomplemented to 15 if a subtraction is being performed.

Figure 4:
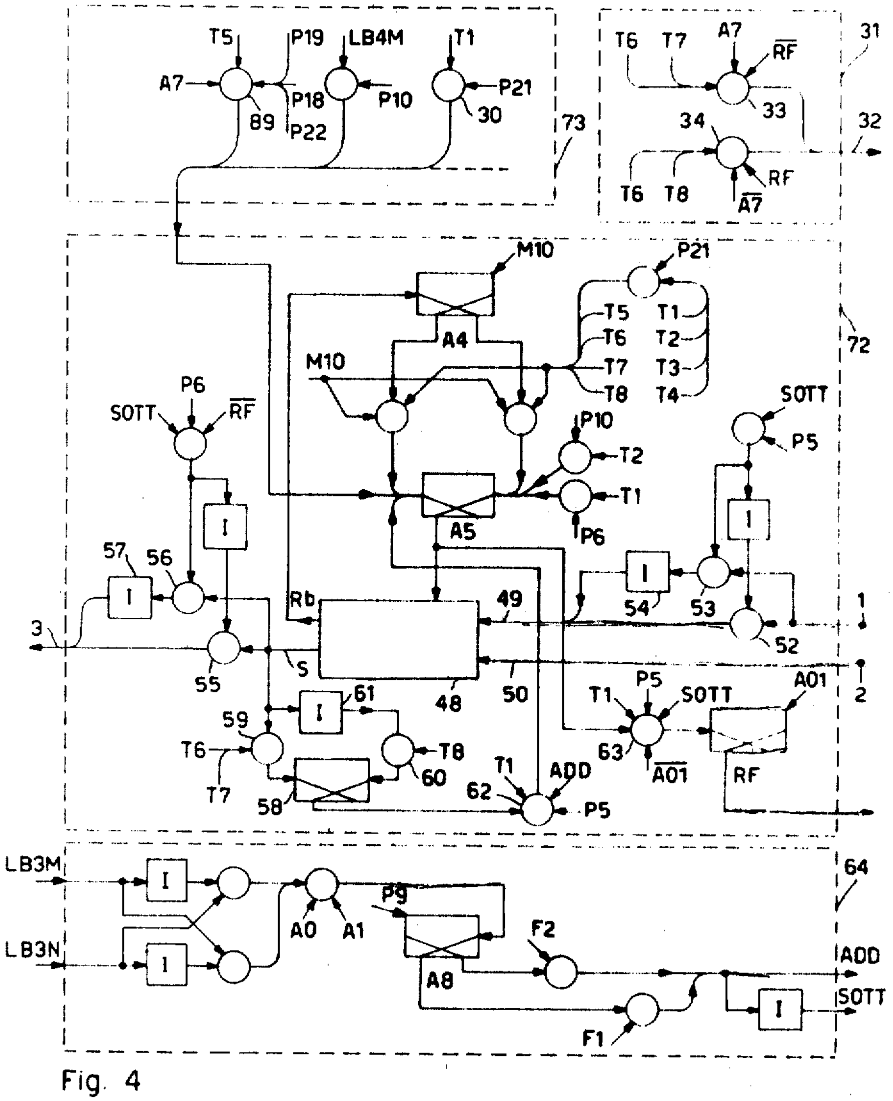
FIG. 4 shows an adder used in an embodiment of the computer according to the invention.
Figure 5:
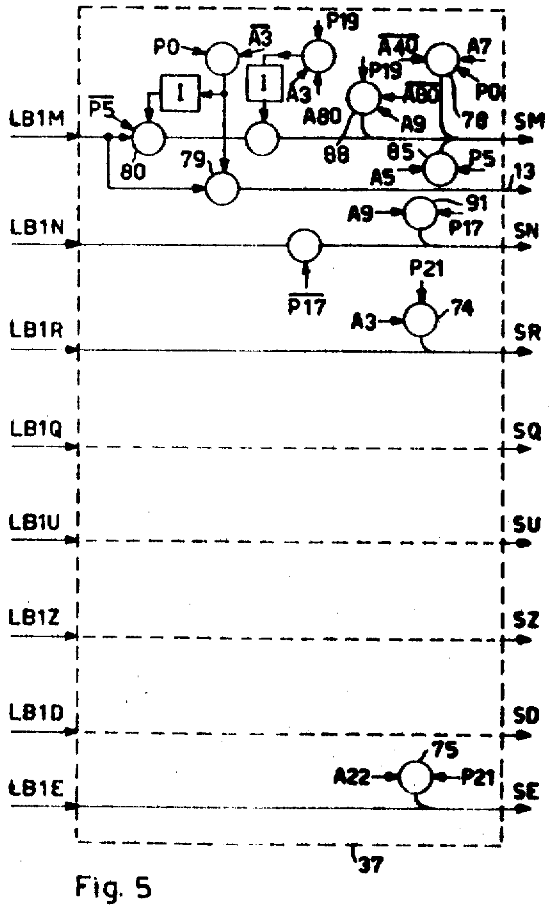
FIG. 5 shows a circuit for controlling the tag bits used in the computer according to the invention.

The modifications to be made in the adder shown in FIG. 4 to make it capable of operating according to the preceding rules are obvious to those skilled in the art.

Figure 8A:
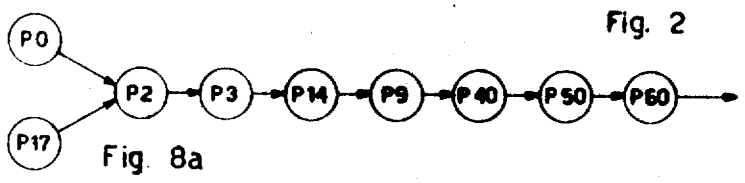
FIG. 8*a* is a diagram showing the sequence of statuses of the computer in the addition or subtraction according to an embodiment of the invention.

From the foregoing it is apparent that whenever the instruction staticisor 16 staticizes the instruction Y, F1 (addition) or Y, F2 (subtraction), the computer is adapted under the control of the sequencing circuit 26 to automatically go through a sequence of statuses which, according to the second embodiment of the adding device of the computer, is as schematically shown in FIG. 8*a*.

More particularly, starting either from the status PO in which said instruction is set up on the keyboard in the manual operation or from the status P17 in which said instruction is extracted from the memory LDR in the automatic operation, the addition (or subtraction) sequence comprises:

Status P2, wherein the contents of the register Y addressed by said instruction is transferred into the register M;

Statuses P3 and P14, wherein the numbers stored in the registers M and N respectively are aligned so as to have their decimal point located in the first decimal denomination C1;

Status P9, wherein the two numbers M and N are examined to determine whether their algebraic signs are in agreement;

Status P40, wherein the two numbers M and N are examined to determine whether number M is greater than number N or not;

Status P50, wherein the two numbers M and N are added together;

Status P60, wherein the radix correction for the sum so obtained is performed.

After this sequence, the computer, if preset for the automatic mode of operation, automatically reverts to the status P17, wherein the next following instruction is extracted; if preset, on the contrary, for the manual mode of operation, it goes through the sequence of statuses P18, P19, P22 during which the number Y is printed out and thereafter is reverts to the status P0 wherein the next following instruction is set up on the keyboard.

Multiplication and division

Figure 8B:
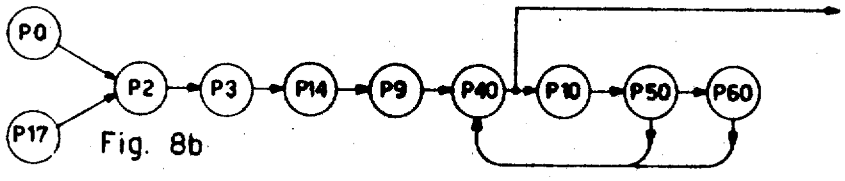
FIG. 8*b* is a diagram showing the sequence of statuses of the computer in the multiplication or division according to an embodiment of the invention.

If the instruction at present staticized in the staticisor 16 is Y, F3 (multiplication) the sequence of statuses the computer goes through, starting either from the status P0 (if in manual operation) or from the status P17 (if in automatic operation), is as follows (FIG. 8*b*):

Status P2 (lasting one memory cycle) wherein the number stored in the register Y (multiplicand) addressed by said instruction is transferred into the register M;

Status P3, wherein the number stored in the register M (multiplicand) is repeatedly shifted until its first (least significant) integer digit containing the decimal point bit B4="1," reaches the first decimal denomination C1 of the register M;

Status P14, wherein the number stored in the register N (multiplier) is repeatedly shifted (one digit period for each memory cycle) until its most significant digit reaches the first decimal denomination C1 of the register N;

Status P9 (lasting one memory cycle) wherein the two numbers to be multiplied are examined as to sign agreement, while the contents of the register N (multiplier) is transferred into the register R for allowing the register N to subsequently accumulate the product;

Status P40 (lasting one memory cycle) wherein the two operands are examined to determine which is the greatest one (this has no relevance when multiplying, but instead when dividing);

Status P10 (lasting one memory cycle) wherein the digit of the multiplier which is stored in the decimal denomination occupied by the decimal point of the multiplicand is diminished one unit, while the multiplier itself is delayed (that is shifted toward the most significant denomination) one digit period;

Status P50 (lasting one memory cycle), wherein the multiplicand M is added to the number stored in the accumulator N;

Status P60 (lasting one memory cycle), wherein the radix correction of the sum obtained in the preceding status is performed.

From this status P60 the machine reverts into the status P40 for repeating the partial sequence P40, P10, P50, P60, which partial sequence is repeated *n* times if *n* is the most significant decimal digit of the multiplier. It is to be noted that the numbers stored in the registers R, N and M are delayed one digit period, that is shifted one decimal denomination toward the most significant denomination, in the statuses P10, P50 and P60 respectively, whereby after each one of said partial sequences P40, P10, P50, P60 said three numbers are restored into their previous alignment. After the *n*th of said partial sequences in order to shift the multiplier (register R) and the partial product (register N) one decimal denomination toward the most significant denominations, a reduced partial sequence comprising the statuses P40, P10, P50 is executed. In the status P50 of this reduced partial sequence, contrary to the normal operation of the computer in the status P50, the switching network 36 does not connect the register M to the adder 72, whereby the number N is shifted without being altered.

Thereafter *m* partial sequences P40, P10, P50, P60 are executed as previously explained, if *m* is the second most significant digit of the multiplier, and so on.

By examining in more details the operation of the computer, it is to be noted that in the status P9 the multiplier is transferred from the register N to the register R via a binary inverter, whereby each decimal digit of the multiplier itself is complemented to 15.

In the status P10 the switching network 36 connects the output LR of the register R to the input 1 of the adder 72, whose output is connected to the input 13 of the register K, whose output 14 in turn is connected to the input SR of the register R so as to build up a closed loop. As the second input 2 of the adder 72 does receive no signal, the contents of the register R recirculates in said loop without being altered and is therefore delayed one digit period in each memory cycle. Moreover, under these conditions said loop is adapted to act as a counter in the way previously explained in the general description, in order to count the adding cycles performed for each digit of the multiplier. More particularly it will be remembered that for having said loop to act as a counter, it is necessary to feed the binary-carry storing bistable device A5 with a counting pulse (that is, to simulate a binary carry) in the bit period in which the minimum-weight bit contained in the counter is fed into the adder. In the present case this bit will be the bit B5 of that decimal digit of the multiplier which is now to be modified by means of the counting pulses. In the present case, when reading the decimal point bit B4="1" of the register M, the bistable device A5 is energized to simulate said binary carry, which carry will be fed to the adder 72 concurrently with the first bit B5 of that digit of the multiplier which, having been complemented to 15, is now processed. Therefore the last mentioned digit will be increased one unit during each partial sequence of statuses P40, P10, P50, P60 as well as during each reduced partial sequence of statuses P40, P10, P50.

Therefore, if *n* is the digit of the multiplier now considered, after *n* partial sequences P40, P10, P50, P60 said digit of the multiplier will become 15. In the meantime, the computer begins to repeat once more said partial sequence, whereby in the status P10 said digit of the multiplier becomes 16, thus producing a final binary carry R8 coming out from the last bit period T8 of said digit of the multiplier. This carry energizes the bistable device A6, which during the following status P50 will affect both the switching network 36 for preventing the register M from being connected to the adder and the logic circuit 27 for causing said status P50 to be followed by status P40 instead of status P60, whereby the partial sequence of statuses the computer goes through in this case will be the reduced sequence P40, P10, P50 in which the partial product produced in the register N is not altered and the partial product itself along with the multiplier are shifted. Immediately after said binary carry R8 has been produced, the bistable device A5 will be deenergized by the clock pulse T2 so as to clear out said carry stored therein, for preventing said carry from being unduly transmitted to the other denominations of the multiplier, because said other denominations must not be modified in this phase of the multiplication.

It is to be noted that, due to the shifting of the multiplier R during said reduced partial sequence P40, P10, P50, the digit of the multiplier next following the digit just considered is shifted into the denomination corresponding to that denomination of the register M which contains the decimal point of the multiplicand and that said relative alignment of the multiplier with respect to the multiplicand will remain unchanged throughout the following partial sequences P40, P10, P50, P60 until also the partial product of said next following digit and the multiplicand will be computed and accumulated, whereby the decimal point bit B4="1" of the multiplicand M acts as a mark for identifying the digit of the multiplier R which is now to be considered.

From the foregoing it is further apparent that the reduced partial sequence P40, P10, P50 executed after completion of the computation of the partial product relating to the last (least significant) digit of the multiplier R will cause said last digit to be shifted one denomination beyond the decimal point of the multiplicand M. Therefore, in the following status P40, during the digit period wherein the decimal point bit B4 of the register M is read out of the memory LDR, no digit-indicating bit B2="1" will be concurrently read out in the register R. Upon occurrence of this circumstance the bistable device A9 will be energized by the reading signal produced by reading out said decimal point bit, whereby the bistable device A9 will affect the logic circuit 27 so as to prevent it from determining as the next following status the status P10. Thus the multiplying operation ends. Said next following status will be either the status P17 (extract the next instruction) if the computer is preset for automatic operation or the status P18 (first status of a sequence P18, P19, P22 wherein the multiplicand Y is printed out) if the computer is preset for manual operation.

In a similar way the division is performed according to the repeated subtraction method.

Printing out a number stored in a register

During the entire printing phase, which for each number to be printed comprises the sequence of statuses P18, P19, and P22, the switching network 36 connects the register K and the adder 72 into a closed loop so as to build up a counter, as previously described. In the status P18, when the void arc of the type drum passes the first time under the printing hammer, the trailing edge of the signal ST energizes the bistable device A7. Therefore, during the first cycle among the plurality of memory cycles which occur in said void arc, the bistable device A3 is energized at the beginning of the signal A2, which signal identifies the time interval in which the number stored in the addressed register appears on the output of said register.

Thereafter said bistable device A3 is deenergized by the next following clock pulse T1, whereby it remains energized only while reading out of the memory the first digit of the number to be printed. As the bistable device A3 is energized, the bistable device A7 is thereafter deenergized.

In the digit period identified by the energization of the bistable device A3 the bits B1, B2, B3, B4 representing the address to be printed, that is the address at present staticized in the staticisor 16, for selecting the register at present addressed, are fed to the stages K5, K6, K7 and K8 respectively of the register K via gate 19. From the foregoing it is apparent that said transfer occurs during the absence of the signal ST, that is, while the void arc of the type drum passes under the printing hammer.

Just before the first character of the various rows of the type drum reaches the printing hammer, the corresponding character signal CK from the timing disc energizes the bistable device A7; as a consequence, the first occurring clock pulse T5 causes a counting pulse to be issued by the gate 89 of the count control circuit 73. The bistable device A7 is deenergized by the same clock pulse T5.

The following timing signals CK from the timing disc act on the computer in a similar manner. Therefore, it is apparent that each character timing signal CK causes a single counting pulse to be generated, although the time interval between two contiguous signals CK comprises more than one digit period, whereby in this status P18 the counter is effective to count the successive signals CK from the timing disc instead of counting the digit periods as in the status P21. Moreover it is apparent that the bistable device A7 has also the function of compensating for the variable phase difference between the signals CK from the timing disc and the clock pulses produced by the generator 44.

The counter counts the successive signals CK. If the internal four-bit representation of the characters to be printed corresponds to the natural number *n*, upon receiving 16—*n* counting pulses the contents of the counter reaches the value 16, whereby in the bit period T8 a binary carry R8 is produced at the output of the adder 72. Due to the previously explained arrangement of the characters around the type drum, it is apparent that said carry may be used to control via gate 90 the actuation of the print hammer, because the character of the type drum which corresponds to said number *n* reaches just in that moment the hammer.

Thereafter, at a certain point of the type drum revolution, the signal ST disappears, whereby the bistable device A7, and thus also the bistable device A3, is again energized.

It is to be noted that, at the end of the digit period during which the bistable device A3 was in the energized state, during the next preceding passage of the void arc of the type drum, the bistable device A6 has been energized. Therefore in the present digit period during which the bistable device A3 is energized the bistable device A6 is found to be energized.

Therefore in the present case the register K is connected to the instruction staticisor 16 via gate 20 instead of gate 19.

Thus in the status P18, when the void arc of the type drum passes the second time under the printing hammer, in the digit period identified by the bistable device A3 being energized, the four bits B5, B6, B7, B8 representing the function part of the instruction at present staticized are written into the stages K5, K6, K7 and K8 of the register K respectively.

Moreover in the digit period identified by the bistable devices A3 and A6 being concurrently energized, the clock pulse T8 causes the circuit 29 to produce a change-of-status timing pulse MG which causes the computer to switch to the status P19.

Thereafter, when the working arc of the type drum reaches the printing hammer, whereby the successive character timing signals CK are produced, said function character is printed in the manner explained for the previous character.

In the status P19 the switching network 36 connects the output of the register at present addressed to the input 13 of the register K in the digit period in which the character to be printed is read out of the delay line. Moreover the switching network 36 connects into a separate closed loop all the memory registers including the addressed register for regenerating their contents.

More particularly, at the beginning of the void arc of the type drum in the next following revolution of the type drum, the bistable device A7 is energized. Therefore, upon reading out of the memory the first digit of the number to be printed (third character of the printed line), which is assumed to be stored in the *m*th decimal denomination, the leading edge of the signal A2 (indicating the length and position of the number in the addressed register) energizes the bistable device A3, which is thereafter deenergized by the next following pulse T1, thus remaining energized only during the digit period in which said digit to be printed is read out of the delay line. The switching network 36 in the status P19 is controlled by the bistable device A3 for connecting the output of the addressed register to the input 13 of the register K only when said bistable device A3 is energized, whereby the bits B1 to B8 of said first digit are written into the stages K1 to K8 of the register K respectively and thereafter recirculate in said register K via the adder 72.

Moreover while the bistable device A3 is energized, the clock pulse T2 first occurring deenergizes the bistable device A7, whereby in the following memory cycles falling within the void arc of the type drum the bistable device A3 cannot be energized again, whereby said digit to be printed is prevented from being unduly entered once more in the register K.

Moreover the same signal which deenergizes the bistable device A3 energizes the bistable device A9, which is thereafter deenergized by the next following clock pulse T1. Therefore the bistable device A9 remains energized during the digit period consumed in reading out of the delay line the digit stored in the ($m$+1st) decimal denomination, which immediately follows the digit to be printed and just entered in the register K, said bistable device being in the deenergized state in the bit period T1 of said digit to be printed. Otherwise stated, each one of the bistable devices A3 and A9 remains energized a single digit period during each revolution of the type drum, and, more exactly, when, during the passage of the void arc of the type drum the digit to be printed in said revolution and the digit to be printed in the next following revolution respectively appears the first time at the output of the delay line.

As the bistable device A9 is energized the tag-bit controlling circuit 37 causes a tag bit B1M="1" to be written via gate 88 in said ($m$+1st) decimal denomination of the register M. Said tag bit B1M will be thereafter used to identify the next digit to be printed during the next following passage of the void arc of the type drum for the purpose of transferring this digit to the register K.

Therefore it is apparent that when printing a number the tag bit B1M="1" is shifted one decimal denomination in each revolution of the type drum for indicating what denomination of the number is to be printed during said revolution.

In the meantime, when the working arc of the type drum passes under the printing hammer, said first digit of the number is printed in the way previously explained. In a similar manner the following digits are printed out.

During the digit period identified by the bistable device A9 being energized and in which the digit to be printed in the next following revolution of the type drum is made available on the output of the delay line, the bistable device A80 is either energized or not depending on whether said digit read out of the delay line contains a decimal point bit B4 or not. Said bistable device A80 will be thereafter deenergized by the same signal that, during said next following revolution, will reset the bistable device A9. Therefore the bistable device A80 will remain energized until in said next following revolution both the digit to be printed in said next following revolution and the next following digit will have been read out of the delay line.

Therefore it is apparent that the bistable device A9 has also the function of identifying in each revolution the digit to be printed in the next following revolution, so as to allow said digit to be examined for the presence of a decimal point bit B4="1" therein, and that the result of said examination will affect the state of the bistable device A80 in order to modify the operation of the printing unit in the next following revolution of the type drum. More particularly, should the decimal point be found in said next following revolution the decimal point must be printed, and printing the digit associated to the decimal point must be delayed. For this purpose during said next following revolution, upon reading out the digit to be printed, the bistable device A80, being then energized, controls the switching network 36 for preventing said digit to be transferred into the register K, whereby instead of said digit the code representation of the decimal point (0000) is written into the register K for being printed in said revolution. Moreover, as the bistable device A80 is energized, the tag bit controlling circuit 37 causes the tag bit B1M="1" to be written again in the decimal denomination of said digit to be printed, instead of shifting said tag bit to the next following denomination, whereby in the next following revolution of the type drum said digit will be recognizable.

The memory cycle in which the last digit of the number is transferred into the register K for being printed is identified by the absence of a digit-indicating bit B2="1" in the digit period (next digit to be printed) identified by the bistable device A9 being energized. Upon detecting this situation, the computer switches to the status P22, in which said last digit and the algebric sign are printed in the way previously explained.

Entering a program through the keyboard

Having preset the commutator 23 so as to produce signal IP ("entering program") the operator sets up on the address keyboard 68 and on the function keyboard 69 the successive instructions of the program to be entered.

Since entering a program via the keyboard into the program registers I and J is similar to entering data via the keyboard into the register M, which operation has been previously described, no further description is deemed to be necessary to those skilled in the art.

After having entered the program into the memory, by actuating a push button AUT the operator may start the automatic execution of said program.

Extracting an instruction

The program having been entered in the memory LDR, actuation of a push button AUT starts the program execution.

The actuation of said button AUT sets the computer in the status P17, in which the switching network 36, beside connecting the input of each memory register to the respective output so as to continuously regenerate its contents, connects the output of the register I or J (or any other instruction register involved in the transfer operation) to the instruction staticisor 16 only during the digit period in which the instruction to be extracted and executed is being read out of the delay line, said digit period being identified by the energization of the bistable device A3.

More particularly, in the first memory cycle occurring during the actuation of said push button AUT, the synchronizing bit B1R="1" which starts the oscillator 45 at the beginning of the first bit period T1 of the first digit period C1 energizes the bistable device A3, which thereafter is deenergized at the end of said bit period T1. Moreover the beginning of the signal AUT energizes the bistable device AI, which, when energized, causes the instruction register I to be addressed and selected via the switching network 36, the instruction register J being in turn addressed and selected when said bistable device AI is deenergized. The bistable device AI acts as an address counter to sequentially address the successive instruction registers I, J, since the program is normally executed by first sequentially executing all the successive instructions stored in the register I, then all the successive instructions stored in the register J.

Therefore during said first digit period C1 the output line LI of the instruction register I is connected to the instruction staticisor 16, whereby the eight bits B1 to B8 of the first instruction are written in the eight stages I1 to I8 respectively of the staticisor 16, wherein they are staticized until, after execution of said first instruction, the next following one is extracted.

Moreover in said first digit period C1, as the bistable device A3 is energized, the clock pulse T8 energizes the bistable device A9, which is thereafter deenergized by the next following clock pulse T8. Therefore the bistable device A9 is adapted to identify, by being in its energized state, the digit period next following the digit period of the instruction being now extracted.

As said bistable device A9 is energized, the tag-bit controlling circuit 37 causes a tag bit B1N="1" to be written via gate 91 into the second decimal denomination C2 of the register N, said tag bit B1N being a mark which will be used to identify said next following instruction to be extracted, which in this case is the second instruction.

Moreover, as said bistable device A9 is energized, the clock pulse T1 of said second digit period C2 energizes the bistable device A6 to indicate that the instruction to be extracted has been recognized and extracted. Therefore, at the end of the memory cycle, the leading edge of the signal A10 causes the gate 33 of the circuit 29 to produce a change-of-status timing signal MG which causes the computer to switch to the next following status, this status being identified by the logic network 27 on the basis of the instruction just extracted and staticized. This next following status is the first status of a sequence of statuses during which said instruction is executed.

At the end of the execution of said first instruction, the computer is caused by the sequence control circuit 26 to automatically revert to the status P17, wherein the second instruction is extracted, and so on.

In general, at the end of the sequence of statuses in which the *n*th instruction has been executed, the computer automatically reverts to the status P17, under the control of signals indicating the completion of the corresponding operation. In the status P17, which lasts a single memory cycle, the delay line is scanned for searching in the register I or J the instruction to be extracted, which is the ($n+1$st) instruction. Recognition of this instruction is made on the basis of the presence of the tag bit B1N="1" in the ($n+1st$) decimal denomination of the register N. Upon reading out of the delay line said tag bit B1N, the bistable device A3 is energized to identify the digit period in which the instruction to be extracted is delivered at the output of the delay line LDR. Under the control of said bistable device A3, the switching network 36 connects the output of the register I or J to the instruction staticisor 16 only during this digit period. Due to energization of the bistable device A3, the bistable device A9 is subsequently energized to identify the next following digit period C($n+2$), whereby in the tag-bit controlling circuit 37 a tag bit B1N="1" is written via gate 91 into said digit period C($n+2$), whereby said tag bit is shifted from the ($n+1$st) instruction being at present extracted to the next following ($n+2$nd) instruction to be extracted.

Should the aforesaid *n*th instruction be the last (22nd) instruction of the register I, the bistable device A9, which in any case in the status P17 is always energized during the only digit period next following the digit period of the instruction being at present extracted, will happen to be energized during the first digit period C1, in which the synchronizing bit B1R="1" starting the next following memory cycle is read out of the memory. The concurrence of said two events (energization of bistable device A9, reading out the start bit B1R) causes the instruction-register addressing bistable device AI to switch so as to be deenergized, whereby in the following statuses P17 the instruction register J instead of I will be addressed and selected. The tag-bit controlling circuit 37 causes as usually a tag bit B1N="1" to be written via gate 91 into the decimal denomination (C1 in the present case) next following the instruction being at present extracted, whereby the first instruction of the register J will be thereafter extracted.

It is thus apparent that the use of a tag bit shiftable along the delay line allows the register I and J to be sequentially scanned for extracting one at a time the successive instructions of the program stored therein, the same tag bit being effective upon reaching the end of an instruction register to advance an instruction-register selecting counter AI for addressing the next following instruction register.

Jump

According to an embodiment of the invention, in the jump instruction the four bits B5, B6, B7, B8, which are used, as in any other instruction, to represent the function part F12, of the instruction itself, are B5=B6=B7=B8="1."

The presence of this four-bit combination in an instruction of the program indicates that the instruction itself is concerned with a jump operation during the execution of the program. In this instruction, the bits B1 and B2 represent an address, while the bits B3 and B4 are used to further specify the nature of the instruction.

More particularly, if B3=B4="1," the instruction is not a true instruction, because, upon being entered into the staticisor 16 does not cause the computer to perform any operation. On the contrary, this instruction is merely a "reference instruction" used as a reference point within the sequence of program instructions, whereby among the 44 instruction of the program stored in the registers I and J it is possible to establish some reference points, each one represented by a reference instruction. There are four different types of reference instrutcions depending on the value of the bits B1 and B2 of the reference instruction, which bits define the "address" of this reference instruction. Each reference instruction marks the beginnning of a subroutine, whereby the reference instructions have the function of marks dividing the program into subroutines.

If B3="0," the instruction is a true jump instruction, the jump being conditional or unconditional depending on whether B4 is equal to "1" or "0."

Each one of said jump instruction, having been extracted from the delay line and staticized in the staticisor 16 during the status P17 of the computer, as any other instruction, causes the computer to switch to the status P23, in which the program registers I, J are scanned to search a reference instruction having the address specified in said staticized jump instruction, that is, having the bits B1 and B2 equals to the corresponding bits of said jump instruction. More particularly, in this status P23 during a first memory cycle the successive instructions stored in the first instruction register I are read out of the delay line and, besides being regenerated, are fed to a comparator, not shown in the drawings and well known in the art. This comparator is adapted to receive each series of eight bits representing an instruction, and to produce an output signal if said instruction is found to be equal to the required reference instruction, that is to have all the bits B3, B4, B5, B6, B7 and B8 equal to "1" and the bits B1 and B2 equal to the bits B1 and B2 of the jump instruction at present staticized.

For instance said comparator may be made of a binary comparator having one input connected to the output of the instruction register at present addressed and selected for receiving said series of eight bits of each scanned instruction and the other input fed by a logic network mechanizing the function $$T1 \cdot I1 + T2 \cdot I2 + T3 + T4 + T5 + T6 + T7 + T8$$

wherein T1 to T8 are the clock pulses produced by the generator 44 and I1 and I2 are the outputs of the two corresponding stages of the instruction staticisor 16, said comparator being adapted to produce an output signal upon receiving at its inputs a pair of simultaneous bit having different values. Said output signal is used to deenergize a bistable device which is energized by the clock pulses at the beginning of each digit period. It is thus apparent that at the end of each digit period this bistable device is energized or not depending on whether the instruction at present scanned coincides with the required reference instruction or not.

If coincidence occurs, said bistable device causes the tag-bit controlling circuit to write a tag bit B1N="1" in the next following decimal denomination to indicate that the next instruction to be extracted (first instruction of the required subroutine) is the instruction stored in said denomination. For the purpose of extracting and staticizing said first instruction of the subroutine, upon detecting said coincidence the computer switches into the instruction-extract status P17, whereby execution of said subroutine begins.

In order to revert to the interrupted main program after completion of said subroutine, it is possible either to put a suitable jump instruction at the end of said subroutine according to a known technique, or to use a tag bit B1U="1" which is recorded in the register U when interrupting said main program, so as to mark the instruction of the register I or J last executed in said main program. For this purpose in the status P17, if a jump instruction is being extracted, contrary to the procedure previously explained, the tag bit B1N="1" is not shifted to the next following decimal denomination of the register N, but instead is transferred into the corresponding denomination of the register U by means obvious to those skilled in the art and not shown in the drawings.

According to a feature of the invention, the reference instructions may be used also in the manual mode of operation for executing certain subroutines. For this purpose the keyboard 22 is provided with four subroutine keys V1, V2, V3, V4, corresponding to the four possible "addresses" of the reference instructions respectively, whereby each subroutine key V1 to V4 has associated therewith an "address" represented by the two bits B1 and B2.

In the manual operation, while the computer is in the status PO waiting for the setting up of a new datum and a new instruction on the keyboard 22, the operator may push one of said four subroutine keys V1 to V4. Actuation of one of said four keys causes the bits B3=B4="0" and B5=B6=B7=B8="1" to be written into the binary stages I3 to I8 respectively of the instruction staticisor 16 via a circuit not shown in the drawings, and the address bits B1 and B2 corresponding to said key to be written into the stages I1 and I2 respectively. Therefore it is apparent that in the status PO the actuation of one of the subroutine keys V1 to V4 simulates the extraction of an unconditional-jump instruction from the delay line to the instruction staticisor 16. Moreover actuation of said subroutine key causes the computer to switch to status P23, in that a signal issued from the keyboard directly sets the bistable devices P1 to P*n* into said status by energizing the bistable device P23 and deenergizing the other bistable devices. As previously explained, in this status P23 the program registers I and J are searched for a reference instruction having the same address B1, B2 of the subroutine key now actuated, and upon finding said reference instruction the computer automatically switches to the status P17 for extracting the first instruction of the subroutine headed by said reference instruction.

As the execution of this subroutine must be automatic, the actuation of the subroutine keys V1, V2, V3, V4 must cause the commutator 23 to switch from the position PM (manual) to the position PA (automatic). Therefore it is apparent that said commutator may be conveniently replaced by a bistable device which is energized upon depressing said subroutine key and deenergized upon terminating said subroutine.

Switching to the next following status

The structure and function of the logical network 29 for generating the change-of-status timing pulses MG will now be briefly described, by considering more particularly those statuses, for instance the addition status P5, in which a number is to be read out of the delay line once, beginning from the least significant digits thereof.

Due to the cyclic nature of the delay line memory, it would be possible to cause the computer to switch from a status to the next following status at a predetermined fixed point of the memory cycle, that is, when a predetermined fixed denomination of the memory registers is being read out of the delay line. For instance, the change of status may occur at the end of the memory cycle, under the control of the synchronizing bit B1R="1" which, by energizing the bistable device A10, starts the clock pulse generator 44. This is the case of some statuses, for instance the status PO (entering a datum or an instruction from the keyboard), P2 (transferring a number to and from a register), P21 (recording in the delay line the synchronizing bits B1R and B1E preliminary to computer operation), P17 (extracting an instruction).

However, as previously explained, the first (least significant) digit of a number may happen to be recorded in any decimal denomination of the relevant register. For instance, during addition, the number having being aligned so as to have its decimal point in the first denomination C1 of the register, has its least significant digit in the denomination C(22-*m*-1) if *m* is the number of digits after the decimal point. Therefore, the addition status P5 should last two memory cycles in order to allow all the digits of the addend to be read out of the delay line.

Figure 7:
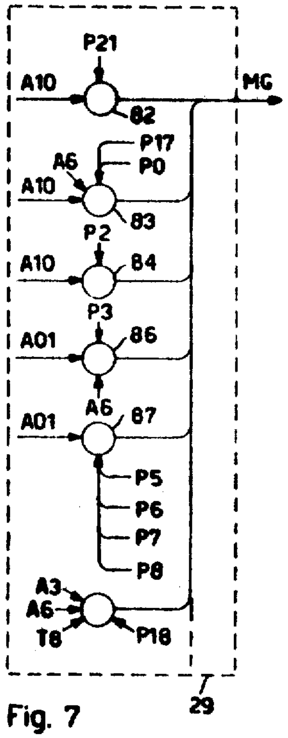
FIG. 7 partially shows a circuit for timing the switching from a status to the next following status in the computer according to the invention.
Figure 2:
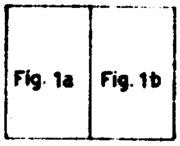
FIG. 2 shows how

The operating speed of the computer is substantially increased according to the invention, in that in some cases the change of status is timed to occur at the beginning of the involved numbers, that is when reading out of the delay line the least significant digit of said numbers. As shown in FIG. 7, in the statuses P5, P6, P7,P8 allotted to the adding operation the logic circuit 29 produces a change-of-status timing pulse in response to the leading edge of the signal AO1 which indicates the length and position of the addends in the delay line.

By this arrangement the duration of these statuses is reduced so as to be equal to the duration of a single memory cycle. The time interval during which the computer remains is one of these statuses may be variably displaced with respect to the beginning of the memory cycle (start synchronizing bit B1R) depending on the length and position of the involved number within the relevant registers.

The advantages obtained by this arrangement may be emphasized when considering the multiply and divide operation, since they are made by repeated additions and substractions.

Splitting the memory registers

According to an embodiment of the invention, the registers Q, U, Z, D, E may be split into two parts for storing two short numbers. For this purpose a tag bit B1Z="1" is recorded as a permanent mark in the first binary denomination (bit period) of a fixed decimal denomination (digit period) of the register Z, for instance the denomination C12.

A bistable device, not shown in the drawing, is energized upon reading the synchronizing bit B1R="1" which starts the oscillator 45 at the beginning of each memory cycle and is there after deenergized upon reading said fixed tag bit B1Z="1," whereby the bistable device is adapted to identify the first part of each memory cycle and distinguish it over the second part thereof, that is to identify the first part of each memory register and distinguish it over the second part thereof.

Since each instruction contains four address bits B1 to B4, it is possible to use the three bits B2 and B4 for identifying one out of the eight addresses Y1 to Y8 of the eight addressable registers Q, U, Z, D, E, M, N, R, the remaining bit B1 being used for addressing either the first or the second part of the register concurrently addressed by said three bits B2 to B4.

The splittable registers Q, U, Z, D, E, are never directly involved in arithmetic operations. Otherwise stated, their contents (apart from the tag bits B1) is never directly modified, in each memory cycle this contents being either regenerated without modification or transferred to or from the registers M or N.

Therefore each one of the two parts of each register Q, U, Z, D, E may be addressed and selected by the switching network 36 under the control of the address bit B1 at present staticized in the instruction staticisor 16. More particularly, if said staticized bit is B1="1,"

the switching network 36 connects the splittable register Q, U, Z, D or E at present addressed by the staticized instruction to either the register N or the register M (depending on the function part of said staticized instruction) only when said bistable device is energized, whereby the transfer operation is performed only to or from the first part of said splittable register, whereas if said staticized bit is B1="0" the connection is effected only when said bistable device is deenergized, whereby the transfer operation is performed only to or from the second part of the splittable register.

It is obvious that any transfer operation to and from a selected part of a splittable register must be preceded by suitable aligning operations performed on the number stored therein.

In the embodiment considered in the general description, each address key was effective, when actuated, to enter for address bits B1 to B4 into the computer. In another embodiment each address key is effective to enter only the three address bits B2 to B4 used to address a register, a separate split key being provided for entering the remaining address bit B1, whereby any part of any splittable register may be normally addressed through the keyboard.

In an alternative embodiment, the address bit B1 may be effective, depending on its value, to cause the transfer operation to begin since reading either the start bit B1R (beginning of the memory cycle) or the tag bit B1Z (beginning of the second half of the memory cycle), in both cases the transfer operation being continued until the end of the cycle.

In another preferred embodiment of the invention, the memory cycle lasts 24 digit periods instead of 22 as heretofore described, each register being able to store either a 22-digit number or two 11-digit numbers. In this case the digit periods C12 and C24 are void, in order to give the computer sufficient time to detect overflow during the arithmetic operations. This arrangement entails modifications which are obvious to those skilled in the art. It is to be pointed out that the lengthening of the memory cycle to 24 digit periods involves only a modification of the number written into the register K at the beginning of the start-computer status P21, because due to the use of the tag bits in the delay line, no digit counter is used in the normal operation of the computer.

Storing single-digit numbers

According to an embodiment of the invention, an instruction F11 allows each decimal denomination of the register to be considered as an independent register for storing a single-digit number to be used as a constant datum in some computations. The execution of the instruction F11 comprises searching and transferring the single-digit number addressed by the address bits of said instruction staticized in the staticisor 16. It is apparent that the search may be effected by first transferring said address bits in the register K, then connecting this register into a closed loop including the adder so as to build up a counter, then counting the succesive digit periods beginning from the first digit period C1, in order to identify the digit period corresponding to said address.

Rounding off

In the status P9, which is allotted, during the four fundamental arithmetic operations, to the comparison of the signs of the operands, it is possible to record in the delay line a tag bit to indicate what number of digits are to be disregarded in the result. For this purpose said number $s$ of digits is manually preset on a commutator not shown in the drawings. When the computer switches to said status P9, said number $s$ is entered into the register K, which is connected into a closed loop including the adder 72 so as to build up a counter. Thereafter said counter counts the successive digit periods, in a manner similar to the status P21, until, after $s$ digit periods, the count reaches a predetermined value.

The circuit 37 is responsive to said counter reaching said count to write a tag bit B1N="1" in the present digit period of the register N, said tag bit being thereafter used to distinguish the digits of the result to be disregarded.

Alternative serial-parallel converters

According to another embodiment of the computer according to the invention the serial-to-parallel converter 42 and the parallel-to-serial converter 43 are simplified, in that they are adapted to convert a group of five bits at a time instead of ten. In this case the reading signals of the registers Q, U, Z, D, E are made simultaneously available on the outputs of the converter 42 one half bit period before the five binary signals of the other five registers. It is apparent that by means of a single bistable device it is possible to store for the duration of one half bit period the reading signal of the register Q, U, Z, D, E at present addressed in order to make it available concurrently with the corresponding signal of the registers I, J, M, N, R.

This allows the contents of a selected register Q, U, Z, D, E to be transferred to any register of the other group.

In this case the time interval in which the clock oscillator 45 remains inoperative occurs at midpoint of the digit period C1.

Alternatively, each one of the serial-parallel converters 42 and 43 may be made of a multitapped electromagnetic delay line having ten contiguous taps spaced a distance corresponding to the time interval between two contiguous bits travelling along the delay line, said electromagnetic delay line being connected as a termination of the magnetostrictive delay line.

What we claim is:

1. In a computer having a delay line memory containing $n$ registers each of said registers being able to store up to $m$, B-bit digits, the corresponding bits of the several registers being stored in contiguous positions on said delay line, and means for recording information on, and for reading the recorded information from, said delay line, the combination comprising:

(a) timing means for defining, for each cycle of information through said delay line, a series of digit periods each including a sequence of $b$ bit periods, each of said bit periods including a sequence of $n$ pulse periods, (b) means responsive to predetermined bits of the information recorded on said delay line for starting said timing means and for stopping said timing means again after $m$ digit periods, (c) parallel-to-serial converting means having $n'$ inputs, where $n'<n+1$, and an output coupled to said recording means and being responsive to said timing means for receiving at least one set of $n'$ binary signals in each bit period for serially entering said sets of $n'$ signals into said delay line in each bit period, (d) serial-to-parallel converting means having an input coupled to said reading means and $n'$ outputs and being controlled by said timing means for simultaneously delivering said recorded sets of $n'$ signals to said $n'$ outputs, and (e) signal processing means fed by said $n'$ outputs and feeding said $n'$ inputs.

2. An electronic computer as claimed in claim 1, wherein $n'=n$.

3. An electronic computer as claimed in claim 1, wherein $2n'=n$.

4. An electronic computer as claimed in claim 3 and further comprising at least a one-bit memory selectively connectable to one of said $n'$ outputs for storing the relevant binary signal at least until the next following binary signal appears on said last mentioned output.

5. An electronic computer comprising:

(a) an acoustic delay line having an input terminal and an output terminal, and having a pulse propagation time subject to first variations, (b) timing means responsive to a start signal for defining a predetermined sequence of digit periods, said sequence having a duration subject to second variations independent of said first variations and never exceeding said pulse propagation time,
(c) means controlled by said timing means for feeding signals to said input terminal,
(d) means controlled by said timing means for processing signals delivered on said output terminal and for applying said processed signals to said feeding means,
(e) means responsive to a start pulse delivered on said output terminal for producing a start signal for said timing means,
(f) and means for transferring said delivered start pulse to said feeding means.

6. An electronic computer comprising:
(a) an acoustic delay line having an input terminal and an output terminal, and having a pulse propagation time subject to first variations,
(b) timing means made operative by a start signal and made inoperative by a stop signal, said timing means when operative defining an uninterrupted sequence of digit periods,
(c) means controlled by said timing means for feeding signals to said input terminal,
(d) means controlled by said timing means for processing signals delivered on said output terminal and for supplying the processed signals to said feeding means,
(e) means responsive to a start pulse delivered on said output terminal for producing a start signal for said timing means,
(f) means for transferring said delivered start pulse to said feeding means,
(g) means responsive to a stop pulse delivered on said output terminal for producing a stop signal for said timing means,
(h) and means for transferring said delivered stop pulse to said feeding means,
(i) the duration of each digit period being subject to second variations independent of said first variations.

7. An electronic computer comprising:
(a) an acoustic delay line having an input terminal and an output terminal, and having a pulse propagation time subject to first variations,
(b) timing means made operative by a start signal and made inoperative by a stop signal, said timing means when operative defining an uninterrupted sequence of digit periods,
(c) means controlled by said timing means for feeding signals to said input terminal,
(d) means controlled by said timing means for processing signals delivered on said output terminal and for supplying the processed signals to said feeding means,
(e) means responsive to a start pulse delivered on said output terminal for producing a start signal for said timing means,
(f) means for transferring said delivered start pulse to said feeding means,
(g) means responsive to a stop pulse delivered on said output terminal for producing a stop signal for said timing means,
(h) means for transferring said delivered stop pulse to said feeding means, and
(i) means for storing said start signal and said stop signal preparatory to operation of the computer,
(j) the duration of each digit period being subject to second variations independent of said first variations.

8. The computer of claim 1 wherein said serial-to-parallel converting means include an electromagnetic delay line having an input fed by the output of said memory delay line and $n'$ output taps, each pair of contiguous taps being spaced a distance corresponding to one of said pulse periods.

9. An electronic computer comprising:
(a) a group of synchronous serial recirculating registers for recording a plurality of multi-bit characters a predetermined bit place in each of the characters being reserved for a tag bit,
(b) means for selectively storing a tag bit in said predetermined bit place of one of said characters of a selected one of said registers, and
(c) means controlled by said stored tag bit for executing a predetermined operation on the corresponding character of one of said registers.

10. An electronic computer comprising:
(a) a group of synchronous serial recirculating registers for recording a plurality of multi-bit characters a predetermined bit place in each of the characters being reserved for a tag bit,
(b) means for selectively storing a tag bit in said predetermined bit place of one of said characters of a selected one of said registers,
(c) means controlled by said stored tag bit for executing predetermined operations on the corresponding character of one of said registers, and
(d) means for conditioning said executing means for executing a different one of said predetermined operations depending on the identity of said selected register.

11. An electronic computer comprising:
(a) a plurality of synchronous recirculating registers each for recording a plurality of $b$-bit characters,
(b) means for interpreting as instructions, binary information stored in the character places of predetermined ones of said registers for controlling said computer,
(c) means for interpreting as numerical information segments of binary information stored in a predetermined $b'$ out of said $b$ bits of the character places of the other of said registers,
(d) means for selectively storing a tag bit in a predetermined one of the remaining bit places of one of said character places of a selected one of the numerical registers, and
(e) means controlled by said stored tag bit for executing a predetermined operation on the corresponding character place of at least one of said registers.

12. An electronic computer comprising:
(a) a sequence control unit for establishing a selected one of a plurality of sequences of statuses for executing the instruction presently under execution by said computer;
(b) means under the control of said sequence control unit for conditioning said computer to execute different sets of predetermined operations in each of said statuses;
(c) a cyclic memory including means for defining a memory cycle, said memory having multidenominational members stored therein;
(d) means for processing the successive denominations of at least one of the stored numbers, and
(e) means asynchronous with respect to said defining means and responsive to said processing means upon processing a predetermined denomination of said one number to cause said sequence control unit to switch to the next status of a sequence.

13. An electronic computer for processing data comprising:
(a) a sequence control unit for establishing a selected one of a plurality of sequences of statuses for executing the instruction presently under execution by said computer;
(b) means responsive to the status presently established by said sequence control unit for conditioning said computer to execute a set of predetermined operations on the data being processed, said set being different for each status;

(c) means operable to cause said sequence control unit to switch to the next status of a sequence upon the completion of the execution of said set of predetermined operations.

14. An electronic computer comprising:

(a) a plurality of synchronous serial recirculating registers each for recording a plurality of multi-bit characters, each character place including *b* bit places, (b) means for selectively storing tag bits in at least a predetermined two bit places of each character place, (c) means responsive to the sensing of tag bit stored in a predetermined one of said at least two bit places for indicating the presence of a significant character in that character place, and (d) means responsive to the sensing of a tag bit stored in a predetermined second one of said at least two bit places for executing a predetermined operation on a character stored in the corresponding character place of at least another of said registers.

References Cited

UNITED STATES PATENTS

| | | | |
|---|---|---|---|
| 3,164,817 | 1/1965 | Fleming | 340—174.1 |
| 3,181,124 | 4/1965 | Hammel | 340—172.5 |
| 3,231,867 | 1/1966 | Bartlett et al. | 340—172.5 |
| 3,235,849 | 2/1966 | Klein | 340—172.5 |
| 3,257,645 | 6/1966 | Lekven | 340—172.5 |
| 3,278,904 | 10/1966 | Lekven | 340—172.5 |
| 3,273,131 | 9/1966 | Strohm et al. | 340—172.5 |
| 2,957,626 | 10/1960 | Havens et al. | 340—172.5 |

RAULFE B. ZACHE, Primary Examiner

UNITED STATES PATENT OFFICE
CERTIFICATE OF CORRECTION

Patent No. 3,469,244 Dated September 23, 1969

Inventor(s) Perotto, Pier Giorgio

It is certified that error appears in the above-identified patent and that said Letters Patent are hereby corrected as shown below:

Column 6, line 72, the reference letter "R" should read -- LDR --.

Column 7, line 29, "stage" should read -- storage --.

Column 7, line 64, "resistor" should read -- register --.

Signed and sealed this 21st day of November 1972.

(SEAL)
Attest:

EDWARD M.FLETCHER,JR.
Attesting Officer

ROBERT GOTTSCHALK
Commissioner of Patents

PO-1050 (10-69)

USCOMM-DC 60376-P69
☆ U.S. GOVERNMENT PRINTING OFFICE : 1969 O—366-334